(12) United States Patent
Anderson et al.

(10) Patent No.: US 11,008,034 B2
(45) Date of Patent: May 18, 2021

(54) CHILD MEDICAL TRANSPORT APPARATUS, ASSEMBLY AND METHOD THEREOF

(71) Applicants: Innovation Lab, LLC, Newport Beach, CA (US); Franciscan Missionaries of Our Lady Health System, Baton Rouge, LA (US)

(72) Inventors: Melissa Lewis Anderson, Baton Rouge, LA (US); Sharon Doescher Wesberry, Woodville, MS (US); Matthew Ibarra, Lakewood, CA (US); Nikolai Poulsen, Irvine, CA (US); Nicole Marie Weikert, Huntington Beach, CA (US)

(73) Assignee: Innovation Lab, LLC, Newport Beach, CA (US)

( * ) Notice: Subject to any disclaimer, the term of this patent is extended or adjusted under 35 U.S.C. 154(b) by 518 days.

(21) Appl. No.: 15/861,473

(22) Filed: Jan. 3, 2018

(65) Prior Publication Data

US 2018/0186395 A1 Jul. 5, 2018

Related U.S. Application Data

(60) Provisional application No. 62/441,894, filed on Jan. 3, 2017.

(51) Int. Cl.
*B62B 5/08* (2006.01)
*B62B 3/00* (2006.01)
(Continued)

(52) U.S. Cl.
CPC ............... *B62B 5/082* (2013.01); *A61G 5/00* (2013.01); *A61G 5/085* (2016.11); *A61G 5/1018* (2013.01);
(Continued)

(58) Field of Classification Search
CPC ........... B62B 5/08; B62B 5/082; B62B 3/144; A61G 2200/14; A61G 2203/76
See application file for complete search history.

(56) References Cited

U.S. PATENT DOCUMENTS

| 2,889,151 A | 6/1959 | Sides |
| 3,087,755 A | 4/1963 | Boman |

(Continued)

FOREIGN PATENT DOCUMENTS

| CA | 2498165 C | 5/2013 |
| CN | 201022798 Y | 2/2008 |

(Continued)

*Primary Examiner* — Brian L Swenson
(74) *Attorney, Agent, or Firm* — Mintz Levin Cohn Ferris Glovsky and Popeo, P.C.

(57) ABSTRACT

An assembly of a first and second child transport apparatus is disclosed. Each apparatus may include: a frame having a frame base, at least one wheel, and a handle; at least one brake and a brake rod, wherein the brake rod is attached to the frame, and wherein the at least one brake actionable upon the wheel when the brake rod is actuated; a carriage pivotably attached to the frame; and a foldable backrest pivotably attached to a base of the carriage, wherein, in a nested position, the foldable backrest of the first apparatus is folded down and the carriage of the second apparatus is positioned partially within the carriage of the first apparatus such that the carriage of the second apparatus is disposed partially over the foldable backrest of the first apparatus; and the brake rod of the first apparatus is released by the handle of the second apparatus.

8 Claims, 20 Drawing Sheets

(51) Int. Cl.
*B62B 5/04* (2006.01)
*A61G 5/00* (2006.01)
*A61G 5/10* (2006.01)
*B62B 3/14* (2006.01)
*B62B 9/08* (2006.01)
*A61G 5/08* (2006.01)
*B62B 5/06* (2006.01)
*B62B 3/02* (2006.01)

(52) U.S. Cl.
CPC .......... *A61G 5/1037* (2013.01); *A61G 5/1094* (2016.11); *B62B 3/007* (2013.01); *B62B 3/144* (2013.01); *B62B 3/146* (2013.01); *B62B 5/04* (2013.01); *B62B 5/0414* (2013.01); *B62B 5/0438* (2013.01); *B62B 5/067* (2013.01); *B62B 9/085* (2013.01); *A61G 2200/14* (2013.01); *A61G 2203/76* (2013.01); *A61G 2203/80* (2013.01); *B62B 3/02* (2013.01); *B62B 3/14* (2013.01); *B62B 9/08* (2013.01)

(56) References Cited

U.S. PATENT DOCUMENTS

| | | | |
|---|---|---|---|
| 3,174,768 A | 3/1965 | Sanders et al. | |
| 3,224,787 A | 12/1965 | Fox et al. | |
| 3,554,334 A | 1/1971 | Shimano | |
| 3,628,635 A | 10/1971 | Yoshigni | |
| 3,636,586 A | 1/1972 | Bollinger et al. | |
| 3,799,567 A | 3/1974 | Toda | |
| 3,999,774 A | 12/1976 | Rehrig | |
| 4,018,449 A | 4/1977 | Anderson | |
| 4,046,394 A | 9/1977 | Thompson, Jr. et al. | |
| 4,118,044 A | 10/1978 | Celms | |
| 4,511,158 A | 4/1985 | Varga et al. | |
| 4,726,596 A | 2/1988 | Ulmer | |
| 4,735,426 A | 4/1988 | McConnell | |
| 4,844,397 A | 7/1989 | Skakoon et al. | |
| 5,094,418 A | 3/1992 | McBarnes, Jr. et al. | |
| 5,236,213 A | 8/1993 | Trickett | |
| 5,292,094 A | 3/1994 | VanKuiken | |
| 5,325,938 A | 7/1994 | Clyde | |
| 5,421,548 A * | 6/1995 | Bennett .................... A61G 5/10 248/129 | |
| 5,509,680 A | 4/1996 | Scharf et al. | |
| 5,517,718 A | 5/1996 | Eichhorn | |
| 5,588,166 A | 12/1996 | Burnett | |
| 5,636,716 A | 6/1997 | Sugimoto et al. | |
| 5,645,290 A * | 7/1997 | Gaffney .................... B62B 3/16 280/33.998 |
| 5,699,988 A | 12/1997 | Boettger et al. | |
| 5,700,021 A | 12/1997 | Yu | |
| 5,765,868 A | 6/1998 | Ventrone et al. | |
| 6,155,902 A | 12/2000 | Kole, Jr. et al. | |
| 6,161,848 A | 12/2000 | Beumer et al. | |
| 6,231,016 B1 | 5/2001 | Slone | |
| 6,315,306 B1 * | 11/2001 | Fernie .................... A61G 5/00 280/33.991 |
| 6,412,795 B1 | 7/2002 | Beumer et al. | |
| 6,464,238 B2 | 10/2002 | Reiland et al. | |
| 6,536,786 B1 * | 3/2003 | Katoozian ............... B62B 3/144 280/33.991 |
| 6,601,860 B2 | 8/2003 | Potter | |
| 6,761,364 B2 | 7/2004 | Murar et al. | |
| 7,065,815 B2 * | 6/2006 | Buchanan ............ A47C 21/026 5/691 |
| 7,219,906 B2 | 5/2007 | Hallgrimsson et al. | |
| 7,374,228 B2 | 5/2008 | Whale | |
| 7,448,476 B2 | 11/2008 | Otterson | |
| 7,497,407 B2 * | 3/2009 | Blankenship ........ A61G 7/0503 248/129 |
| D606,596 S | 12/2009 | Kruger | |
| 8,070,180 B2 | 12/2011 | Stiba | |
| 8,388,015 B2 | 3/2013 | Chen | |
| D706,203 S | 6/2014 | Gibson | |
| 9,084,710 B2 | 7/2015 | Paul et al. | |
| 9,327,749 B2 | 5/2016 | Young et al. | |
| 9,333,977 B2 | 5/2016 | Herlitz et al. | |
| 9,402,774 B1 * | 8/2016 | Martin .................... B62B 9/26 |
| 9,730,846 B2 * | 8/2017 | Kutsch .................... A61G 5/10 |
| 2004/0075228 A1 | 4/2004 | Duffey | |
| 2007/0267834 A1 * | 11/2007 | Amdahl .................... B62B 7/04 280/47.38 |
| 2008/0309037 A1 | 12/2008 | Hebert | |
| 2011/0233902 A1 | 9/2011 | Ohnishi | |
| 2017/0080967 A1 | 3/2017 | Atkins | |

FOREIGN PATENT DOCUMENTS

| | | |
|---|---|---|
| EP | 0770535 A1 | 5/1997 |
| EP | 0770535 B1 | 4/1999 |
| JP | 2004313401 A | 11/2001 |

\* cited by examiner

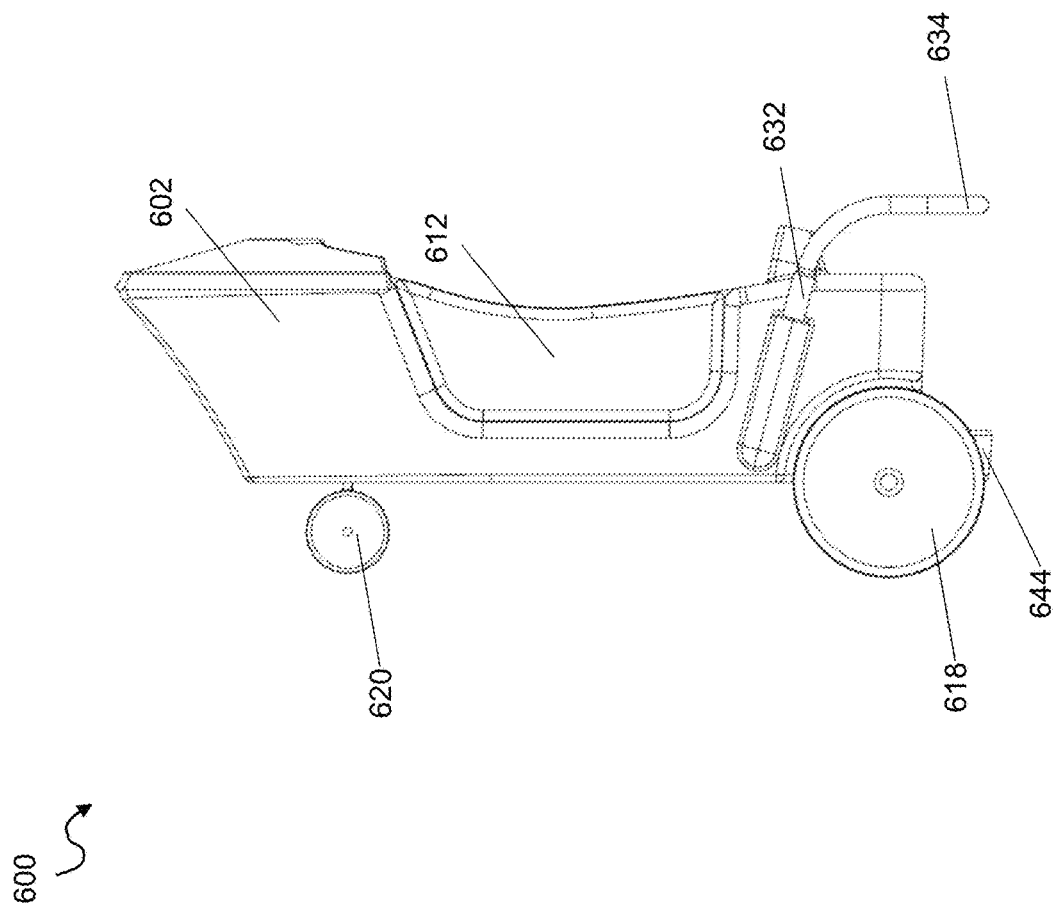

CHILD MEDICAL TRANSPORT APPARATUS, ASSEMBLY AND METHOD THEREOF

CROSS-REFERENCE TO RELATED APPLICATIONS

This application claims priority to U.S. Provisional Application No. 62/441,894 filed on Jan. 3, 2017 which is incorporated herein by reference in its entirety.

BACKGROUND

Children can experience anxiety and become easily upset in hospitals and medical settings. Most medical transport systems are designed for adult use and do not provide features directed towards improving a child's experience, such as while being transported through a medical facility. Furthermore, most hospitals and medical facilities are not equipped with excess storage for storing medical related devices that are tailored for children. In some instances, it has been shown that by reducing stress experienced by a patient, including a child, the recovery and/or overall well-being of the patient can be improved.

SUMMARY

A first aspect of the disclosure is directed to an assembly of child transport apparatuses. The assembly may include: at least a first child transport apparatus and a second child transport apparatus, each child transport apparatus including: a frame having a frame base, at least one wheel attached to the frame base, and a handle, wherein the frame base includes a front portion that is tapered relative to a rear portion of the base, and wherein the handle is attached to the rear portion of the frame base; a braking mechanism including at least one brake and a brake rod, wherein the brake rod is attached to the frame adjacent to the handle, and wherein the at least one brake is actionable upon the at least one wheel when the brake rod is in a non-actuated position; a carriage pivotably attached to the rear portion of the frame, the carriage including a pair of opposing sidewalls wherein the pair of opposing sidewalls taper towards each other at the front portion of the frame, and wherein a rear end of each sidewall is spaced apart relative to the opposing sidewall at the rear portion of the frame; a foldable backrest pivotably attached to a base of the carriage; and an accessory arm attached to the frame and configured to support an accessory, the accessory arm being moveable translationally, wherein, in a nested position of the first and second child transport apparatuses, the foldable backrest of a first child transport apparatus is in a folded down position and the carriage of the second child transport apparatus is positioned at least partially within the carriage of the first child transport apparatus such that the carriage of the second child transport apparatus is disposed at least partially over the foldable backrest of the first child transport apparatus; and wherein, in the nested position, the brake rod of the first child transport apparatus is actuated by a portion of the second child transport apparatus such that the brake of the first child transport apparatus is in an actuated, non-braked position.

A second aspect of the disclosure relates to a child transport apparatus. The child transport apparatus may include: a carriage having a seat portion integrally formed therein; a set of wheels attached to an underside of the carriage, the set of wheels including a pair of rear wheels; a handle mechanism attached to the carriage, the handle mechanism being at least one of: foldable or retractable; and a platform extending from a lower rear surface of the carriage, wherein the child transport apparatus is configured to be positioned on a rear end of the child transport apparatus during storage, and wherein during storage, the child transport apparatus rests on at least two of: the rear surface of the carriage, a rear surface of the platform, the handle mechanism when the handle mechanism is in a folded or retracted position, or the pair of rear wheels.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 20 shows a side view of the child transport apparatus of FIG. 19 when turned on its rear end.

Figure 1:
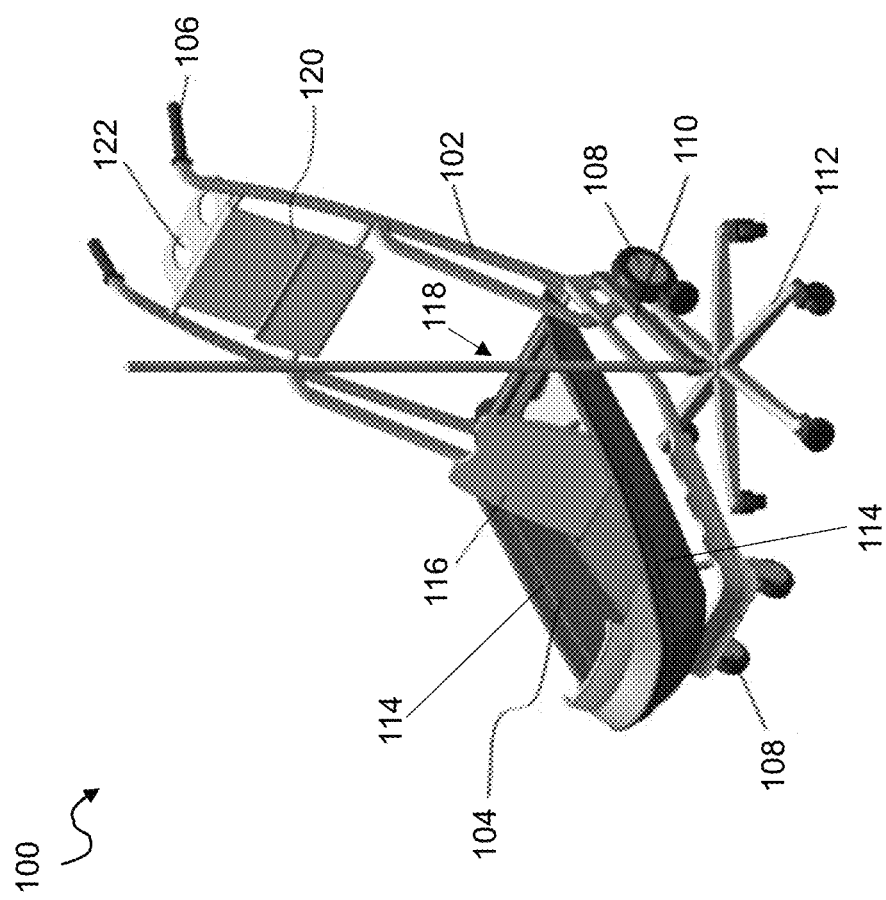
FIGS. 1 and 2 show a perspective view of a child transport apparatus according to an embodiment of the disclosure.

It is noted that the drawings of the subject matter are not necessarily to scale. The drawings are intended to depict only typical aspects of the subject matter, and therefore should not be considered as limiting the scope other disclosed subject matter. In the drawings like numbering represents elements between the drawings.

DETAILED DESCRIPTION

Aspects of the current subject matter can include a child medical transport apparatus, and assembly thereof, that is configured to transport children (e.g., approximately 1-10 years of age) in and around a medical facility (e.g., hospital, medical quarters, etc.). The child transport apparatus described herein can be configured to connect and/or adapt to various medical devices, including various monitoring devices and medical devices (e.g., intravenous (IV) pole/bag, oxygen tank, etc.), thereby preventing medical care from being interrupted during transport of the patient. As such, the present child medical transport apparatus allows young patients to be transported to and from different areas of the hospital along with their monitoring devices and/or other medical equipment. Furthermore, the child medical transport apparatus can include various device coupling features that allow for efficient and effective coupling and uncoupling of medical equipment to the child medical transport apparatus. Such device coupling features can also be configured to allow the child medical transport apparatus to efficiently and effectively travel around medical facilities, including through narrow passageways and doors. The child medical transport apparatus described herein can further include a variety of features that are configured for smaller patients, such as children. For example, the child medical transport apparatus can include adjustable seating and/or positioning features that are suitable for smaller bodies (e.g., children between the ages of 1 to 10 years old). Various other features can be included in the child medical transport apparatus for improving user experience. For example, the child medical transport apparatus can include permanent and/or replaceable decorative features that can appeal to children to thereby reduce stress experienced by the children. Other features, such as a cup holder and/or chart holder can provide additional uses and benefits associated with the child medical transport apparatus.

FIG. 1 illustrates an embodiment of a child medical transport apparatus 100 which may include a frame 102 with a carriage 104 coupled thereto that is configured to hold a child-sized patient. As shown in FIG. 1, frame 102 can include at least one handle 106 that can be grasped by a user (e.g., family member or medical professional) for controlling the transport of child transport apparatus 100. More specifically, as shown, frame 102 can include a pair of handles 106 disposed on opposing sides of child transport apparatus 100. Frame 102 can be coupled to one or more wheels or casters 108, such as two front and two rear casters, that assist with efficiently transporting child transport apparatus 100. However it is to be understood that any number of wheels or casters can be used without departing from aspects of the disclosure.

Figure 2:
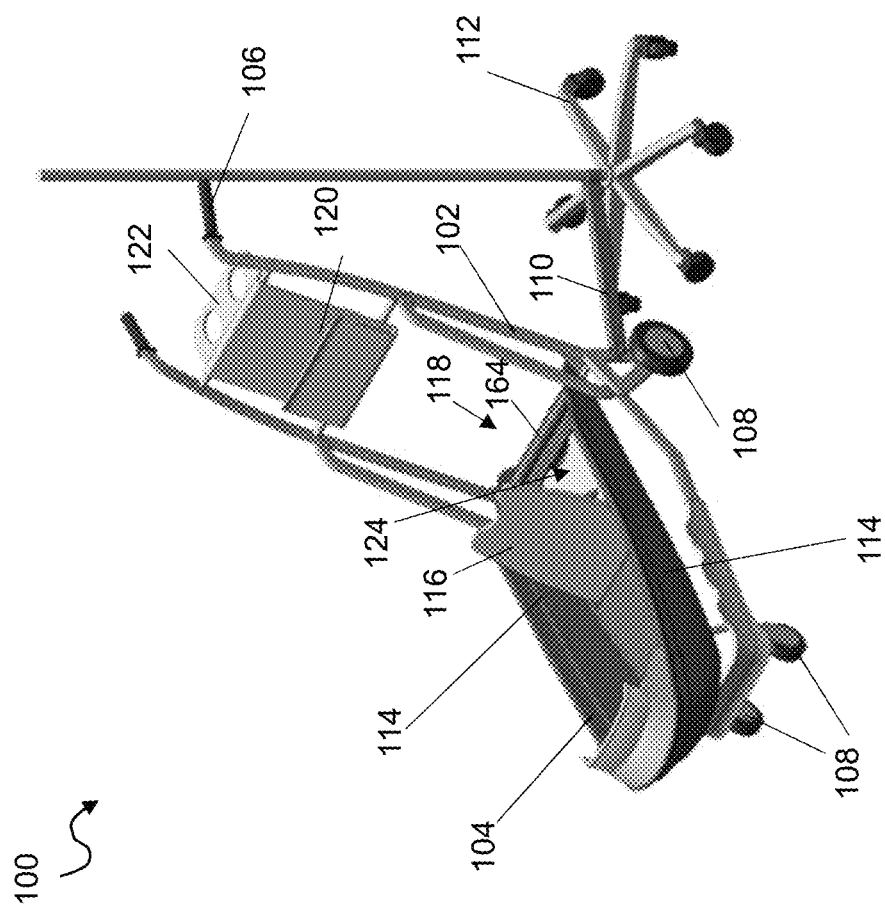

Frame 102 can also include and/or couple to a variety of device coupling features. As shown in FIG. 1, a device coupling feature can include an IV pole swivel arm 110. IV pole swivel arm 110 may couple to frame 102 at a first end and couple to a part of an IV system 112 (e.g., an IV pole and an IV pole base) at a second end. For example, IV pole swivel arm 110 can be pivotably coupled to frame 102 and/or pivotably coupled to IV system 112. In this configuration, IV pole swivel arm 110 can allow IV system 112 to form a variety of configurations and/or angles relative to frame 102. For example, as shown in FIG. 1, IV pole swivel arm 110 can allow IV system 112 to travel alongside carriage 104, and as shown in FIG. 2, IV pole swivel arm 110 can pivot to allow IV system 112 to be positioned at a rear end of carriage 104. This can allow child transport apparatus 100 to maneuver through various passageways, such as doors and hallways, having a variety of configurations and sizes. Although IV pole swivel arm 110 is described as coupling IV system 112 to frame 102, IV pole swivel arm 110 can be configured to couple a variety of medical related devices to frame 102 without departing from the scope of this disclosure. IV pole swivel arm 110 can be connected to frame 102 via some form of pivoting from the back area of frame 102, e.g., proximal portion of frame 102. IV pole swivel arm 110 can attach to the base of an IV pole via some form of latch, loop, rope, or adhesive connection (not shown). IV Pole swivel arm 110 can pivot from the middle of carriage 104 to the back of child transport apparatus 100 about the back side of frame 102 on either side of child transport apparatus 100 relative to where the patient sits. The front and back casters, e.g., wheels 108, can be far apart enough to accommodate a portion of the IV pole base diameters. Any of the device coupling features described and contemplated herein can assist with releasably coupling a variety of medical devices to child transport apparatus 100 and/or allowing child transport apparatus 100, along with the coupled medical device(s), to travel through various passageways/hallways of a medical facility. Frame 102 may also include a patient file holder 120 and cup holder accessory 122 coupled thereto.

Carriage 104 can be sized and shaped to effectively contain and support a child patient for transport. For example, as shown in FIG. 1, carriage 104 can include raised sides 114 that can prevent a child from falling out of carriage 104. In some implementations, carriage 104 can include a seatback or backrest 116 that is pivotably coupled to carriage 104 and can be secured at a variety of angles relative to the base of carriage 104. This can allow the patient to sit at a variety of angles, including lying flat within carriage 104. In some embodiments, backrest 116 can pivot such that backrest 116 is positioned substantially flush with the base of the carriage. As used herein, the terms "about," "substantially," "approximately," and variations thereof are intended to include the degree of error associated with measurement of the particular quantity based upon the equipment available at the time of filing the application.

Figure 3:
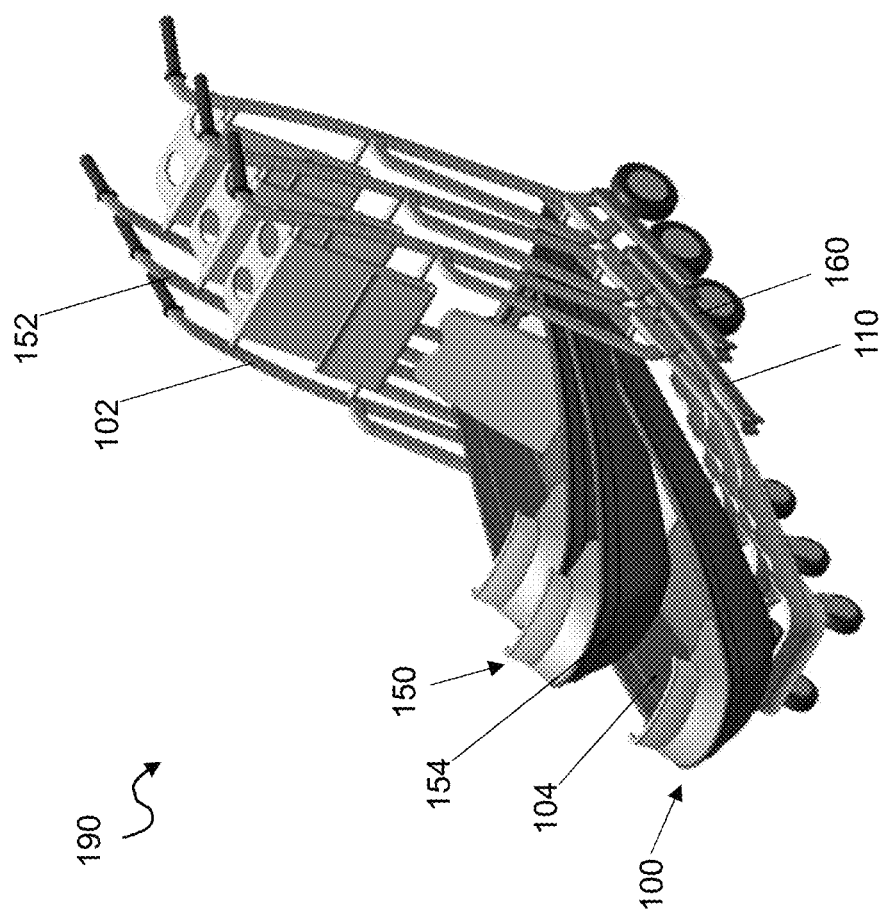
FIG. 3 shows a perspective view of an assembly of child transport apparatuses according to an embodiment of the disclosure.

To assist with storage and saving space, some implementations of the child transport apparatus 100 can be collapsible and/or stackable, as shown in FIG. 3. FIG. 3 shows an assembly of child transport apparatuses 190 including child transport apparatus 100 and child transport apparatus 150. The ability to collapse and/or stack multiple child transport apparatuses can provide a substantial benefit when considering medical facilities that have limited storage space. Features that can assist with the collapsibility and stackability of child transport apparatus 100 are described in greater detail herein.

For example, referring back to FIG. 2, a proximal end 118 of carriage 104 can be pivotably coupled to frame 102 thereby allowing carriage 104 to pivot and form various angles relative to frame 102. Some embodiments of carriage 104 can also include a proximal end 118 that does not have a raised side thereby allowing a carriage 154 of another child transport apparatus 150 to slide over and into carriage 104 of child transport apparatus 100, such as during stacking or nesting of child transport apparatus 100, 150, as shown in FIG. 3. As shown in FIG. 3, carriages 104, 154 can stack on top of each other in part due to each carriages' 104, 154 ability to pivot relative to frames 102, 152. Furthermore, the base of frames 102, 152 can be open at a proximal end and taper distally thereby allowing another base of another frame 102, 152 to advance within the open proximal end to effectively stack and form a compact configuration between child transport apparatuses 100, 150.

In use, for example, the child transport systems can be stacked similar to grocery carts in that a second child transport apparatus, e.g., child transport apparatus 150, can be advanced into a proximal end of a first child transport apparatus, e.g., child transport apparatus 100. As the second child transport apparatus advances distally into the proximal end of the first transport apparatus, the carriage of the second child transport apparatus, e.g., carriage 154, can pivot and advance along the carriage of the first child transport apparatus, e.g., carriage 104, until the frames of the first and second child transport apparatuses, e.g., frames 102, 152, are coupled together.

The device coupling features can also be configured to assist with collapsing and/or stacking child transport apparatuses 100, 150. As shown in FIG. 3, IV pole swivel arms 110, 160 can pivot such that IV pole swivel arm 110, 160 lays flush along respective frames 102, 152. This can assist with creating a compact configuration, such as during storage and stacking of the child transport apparatuses 100, 150. As mentioned herein, although IV pole swivel arm 110, 160 is disclosed and shown herein, various other device coupling features can be included of which any can assist with the stacking and creating compact storage of the child transport apparatuses 100, 150 without departing from the scope of this disclosure.

As mentioned herein, some embodiments of child transport apparatus 100, 150 can include permanent and/or removable decorative features that can enhance the use of child transport apparatus 100, 150, such as for the child being transported. For example, carriage 104, 154 can have a variety of shapes and sizes, as well as designs that not only accommodate a child but also provide an enhanced experience for the child. By way of further example, carriage 104, 154 can be shaped in the form of a character or vehicle (e.g., boat, rocket ship, princess carriage, train, plane, car, etc.), which can reduce stress and provide a more 'fun' experience for patients. In some embodiments, one or more decals can be releasably coupled to carriage 104, 154 and/or frame 102, 152 thereby allowing a variety of décor associated with child transport apparatus 100, 150. This can allow the décor of the child transport apparatus 100, 150 to enhance user experience based on the user.

In some variations one or more of the following features can optionally be included in any feasible combination. Clearance between the wheels, e.g., wheels 108 (FIGS. 1-2), and under frame 102 can allow for the maximum diameter and height for an IV pole base. In some embodiments, carriage 104, 154 can be connected via two dowel pivots on opposite sides of the back of frame 102, 152. When a frame of one child transport apparatus, e.g., frame 152, slides into a frame of another child transport apparatus, e.g., frame 102, the carriage of the second child transport apparatus, e.g., carriage 154, can ramp on top of the carriage of the first child transport apparatus, e.g., carriage 104.

A round latitudinal cutout or aperture (e.g., aperture 162 (FIG. 4)) on the underside of the carriage (e.g., carriage 104) can rest on or matingly engage with a projection (e.g., projection 164 (FIG. 2)) on the back of the adjacent carriage during nesting. During nesting of multiple child transport apparatus, the apertures of each carriage can rest on the projection of the preceeding, adjacent carriage. The weight of the carriage above can prevent the back transport from sliding out accidentally. Backrest 116 can pivot from the base of carriage 104 to an angled position. There can be a pivot creating the axis of rotation to pivot backrest 116. Carriages can be customized with visual accessories that enhance the theme of the carriage (e.g. sails on a boat, wings on a rocket ship, doors for a princess carriage). These accessories can be painted, or graphically adhered (stickers), or even have form and shape and be attached to the carriage.

Figure 5:
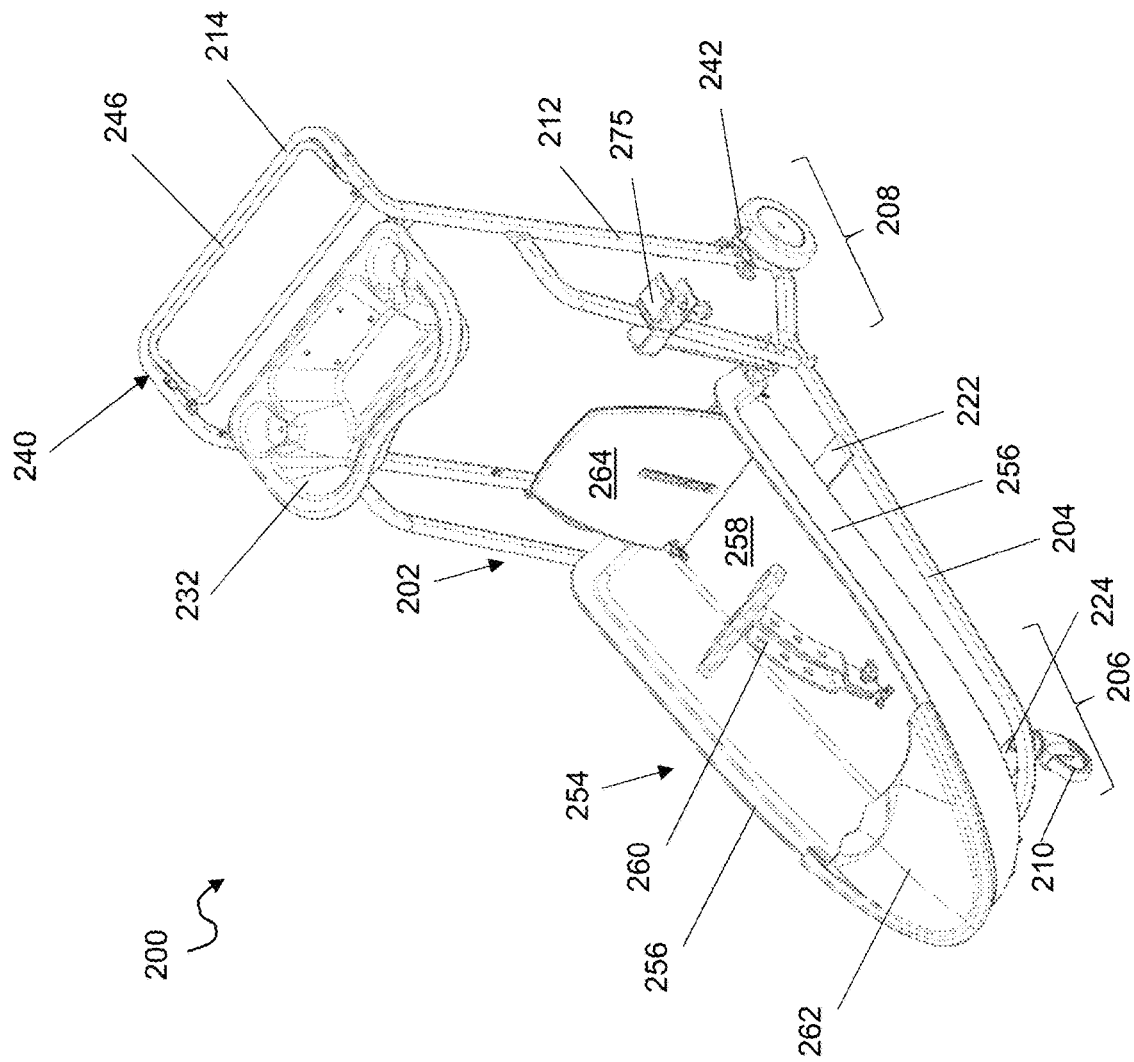
FIG. 5 shows a perspective view of a child transport apparatus according to an embodiment of the disclosure.
Figure 6:
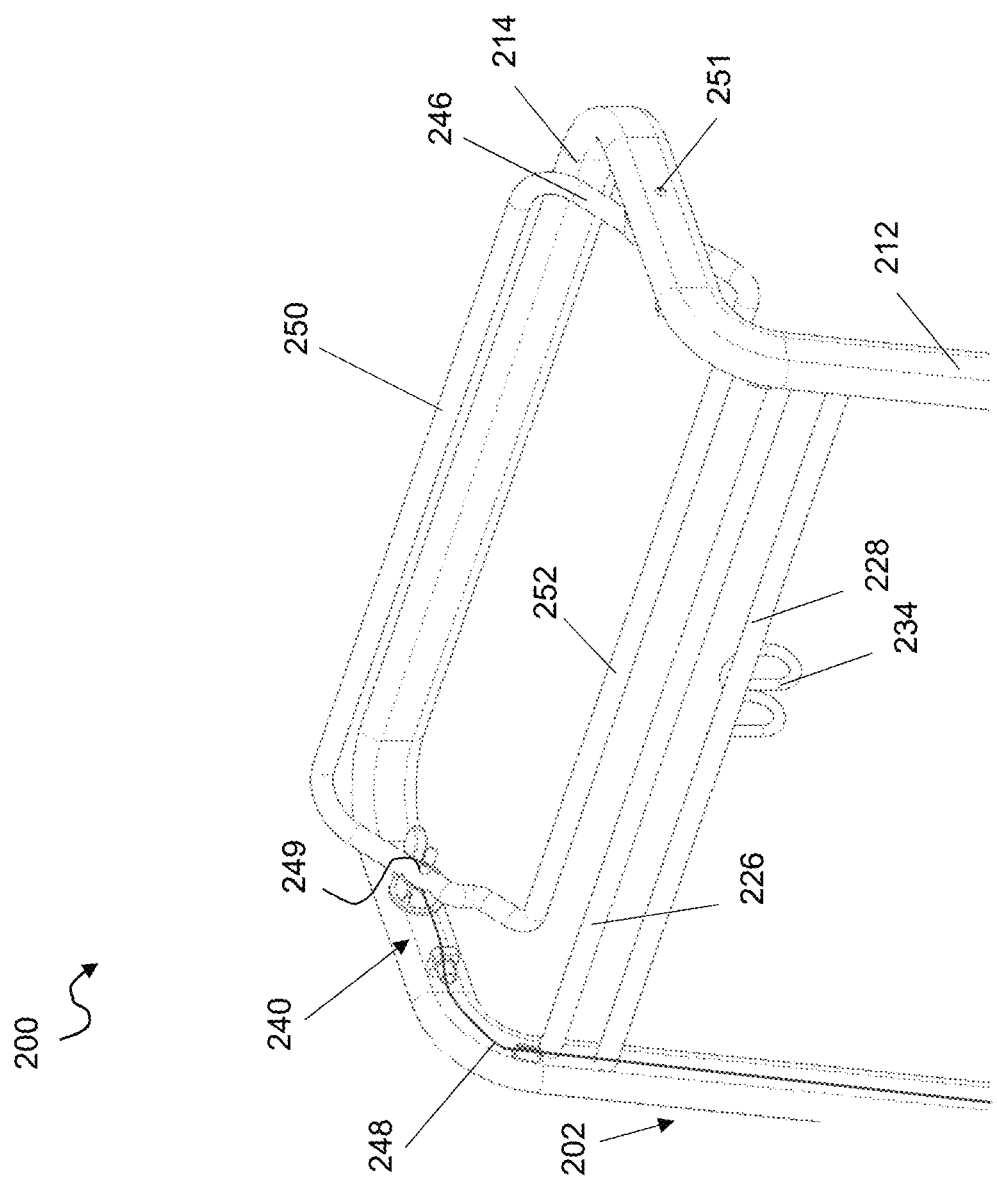
FIG. 6 shows an enlarged view of the handle and brake rod in a non-actuated (braked) position according to an embodiment of the disclosure.
Figure 7:
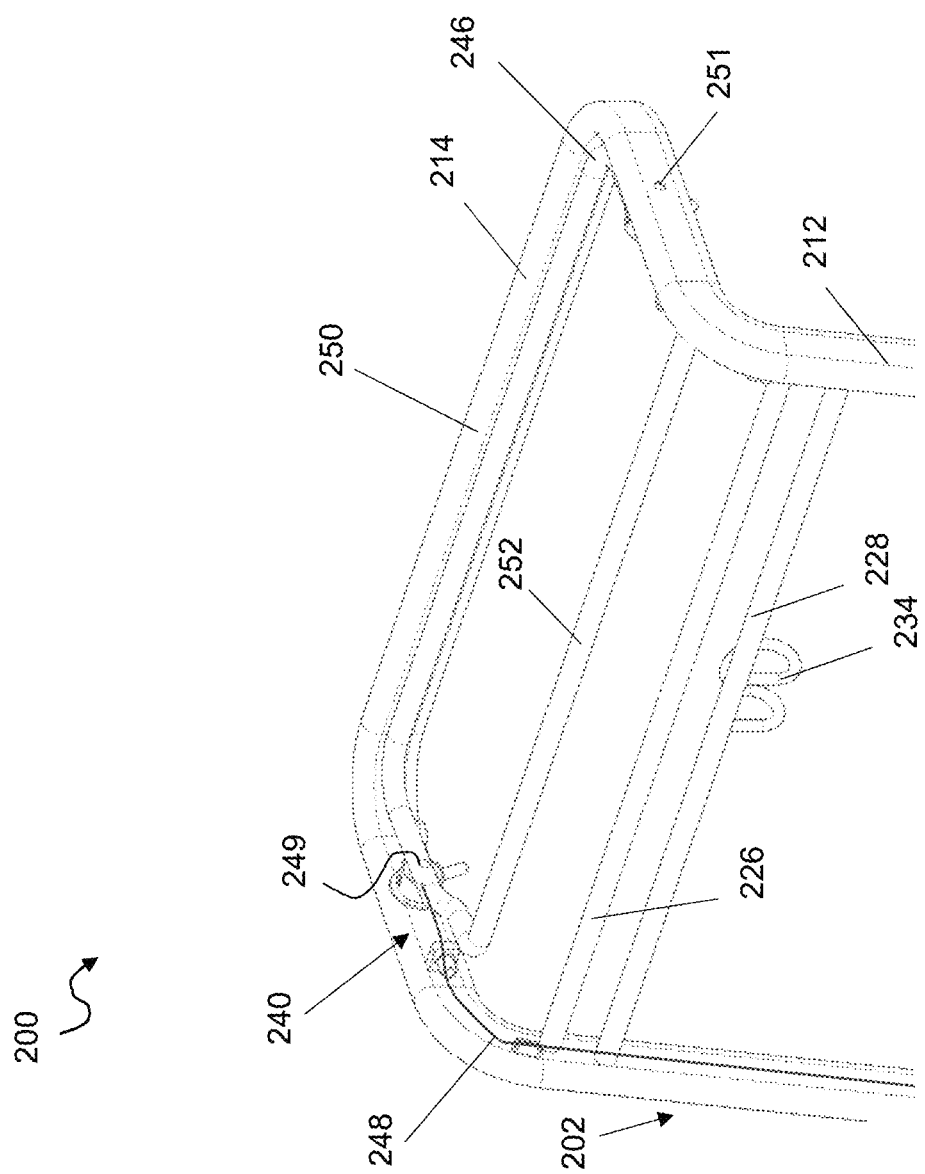
FIG. 7 shows an enlarged view of the handle and brake rod in an actuated (non-braked) position according to an embodiment of the disclosure.

FIG. 5 shows a child transport apparatus 200 according to another embodiment of the disclosure. In this embodiment, child transport apparatus 200 can include a frame 202 having a frame base 204. Frame base 204 may include a front portion 206 that is tapered relative to a rear portion 208 of frame base 204. As used herein, a "front portion" or "front end" may refer to portion or end of the relative feature that is in the direction that the patient faces during use of child transport apparatus 200. Whereas a "rear portion" or "rear end" may refer to a portion or an end that is opposite front portion/front end and is in a direction that is to the back of the patient during use. Frame base 204 may extend substantially horizontally and be positioned substantially parallel to the ground or surface (not shown) that child transport apparatus 200 is positioned on when in use. At least one wheel or caster 210 may be attached to frame base 204 to assist with transporting and/or movement of child transport apparatus 200. As shown in the figures, four wheels are shown. However, it is to be understood that any number of wheels can be included without departing from the disclosure. Frame 202 may also include an extension portion 212 that is substantially perpendicular to or extends vertically from frame base 204. As such, in this embodiment frame 202 may be substantially L-shaped. Further, a handle 214 may be attached to rear portion 208 of frame base 208. More specifically, as shown in FIG. 5, handle 214 may be positioned on or integrally formed as part of extension portion 212. It is to be understood that extension portion 212 may extend vertically from frame base 204 at any angle desired in order to provide a desired height of handle 214 relative to the user, and is not so limited to being disposed perpendicular to frame base 204. As shown in FIGS. 5-7, handle 214 may extend horizontally between opposing sides of frame 202 about rear portion. Handle can be grasped by a user for controlling (e.g., pushing, pulling, and/or turning) the transport of child transport apparatus 200.

Frame 202 may also include one or more cross-bars that extend from opposing sides of frame 202. For example, referring to FIG. 5, a first and second crossbar 222, 224 may extend from opposing sides of frame 202 at frame base 204. Crossbars 222, 224 may assist in supporting a carriage of child transport apparatus as will be described herein. Further, referring to FIGS. 6-7, a third and fourth crossbar 226, 228 may extend from opposing sides of frame 202 along extension portion 212. Referring to FIG. 5-7 together, a cup holder, container/basket and/or combination thereof (hereinafter basket 232) for holding patient or user belongings, a patient file, a patient chart, etc. may be attached to frame 202. More specifically, basket 232 may be attached to one or more crossbars, e.g., crossbars 226, 228, about extension portion 212. Basket 232 may be attached to crossbars 226, 228 by, e.g., nuts, bolts, screws, adhesives, welds, or any now known or later developed attachment means. Additionally, one or more hooks 234 may be optionally provided on a portion of frame 202. Hook 234 may also be provided to hold patient or user belongings, e.g., a sweater or purse/bag.

As shown in FIGS. 6-7, hook 234 may be provided on one or more crossbars 226, 228. However, it is to be understood that hook 234 may be provided on another portion of frame 202 and/or child transport apparatus 200 without departing from aspects of the disclosure. Hook 234 may be coupled, for example, by screws, bolts, adhesives, or welds. However, any other now known or later developed means for coupling a hook to a frame may be used without departing from aspects of the disclosure. While the figures show basket 232 provided on a forward facing side of crossbars 226, 228 and hook 234 is shown as being provided on a rearward facing platform of crossbars 226, 228, it is to be understood the reverse may be true without departing from aspects of the disclosure.

Frame 202 (including frame base 204, extension portion 212, handle 214, crossbars 222, 224, 226, 228) may be integrally formed as one piece or part. Frame 202 may be composed of at least one of: a metal, wood, plastic, or other material substantially rigid enough to transport a patient thereon. In some embodiments, portions of frame 202 (i.e., frame base 204, extension portion 212, handle 214, crossbars 222, 224, 226, 228) may be separate pieces that may be coupled, attached, or connected together. For example, where portions of frame 202 are composed of metal, such portions may be welded together.

Still referring to FIGS. 5-7. child transport apparatus 200 may also include a braking mechanism 240. Braking mechanism 240 may prevent child transport apparatus 200 from moving or changing positions when in a non-actuated, braked position. Braking mechanism 240 may include at least one brake 242, at least one brake rod 246, and a brake line 248. Brake rod 246 may be attached to handle 214. More specifically, brake rod 246 may be positioned substantially between handle 214 and crossbars 216, 218 (FIGS. 6-7 only) about an upper portion of extension portion 212. As shown, brake rod 246 may be substantially rectangular in shape and may extend substantially along a length of, and be positioned substantially parallel to handle 214 in an actuated position (FIG. 7). However, in other embodiments, brake rod 246 need not be rectangular in shape and may instead be u-shape, a square u-shape, a rectangular u-shape, or any shape suitable to allow actuation by the user and disengagement of brake 242 on wheels 21 as may be desired. Positioning of brake rod 246 in this way allows a user to easily grab brake rod 246 while maintaining control of handle 214 and/or child transport apparatus 200. In some embodiments, brake rod 246 may include a through-hole 249 in opposing ends thereof that may align with a through-hole 251 within a portion of extension portion 212 that is disposed between handle 214 and crossbars 216, 218. Further, a pin or screw may be inserted within each through-hole 251 and the corresponding through-hole 249 to allow movement of brake rod 246 between actuated and non-actuated positions.

Brake rod 246 may be biased in the non-actuated, braked position (FIG. 6) such that if a user releases brake rod 246, child transport apparatus 200 comes to a stop. That is, brake rod 246 will automatically return to the non-actuated, braked position (and brake 242 will contact wheels 210) when a user releases his or her hand from brake rod 246. The non-actuated, braked position may also be referred to as the resting position of brake rod 246. Brake rod 246 may be biased by, e.g., the weight of brake rod 246 distal to the user being greater than the proximal weight, a torsion spring (not shown) centered around the pivot point, a tension spring (not shown) between brake rod 246 and frame 202, and/or a compression spring 257 (FIG. 9) that actuates brake 242. In some embodiments, brake rod 246 may include an active portion 250 and an inactive portion 252. Active portion 250 may refer to the portion of brake rod 246 that the user contacts or grabs together with handle 214 when the user wants to move child transport apparatus 200. Inactive portion 252 refers to the opposing portion of brake rod 246 (when brake rod 246 is rectangular in shape) that the user does not contact or grab during use. As shown, in the non-actuated, braked position, active portion 250 is elevated slightly relative to inactive portion 252 (see FIG. 6). In the actuated, non-braked position, active portion 250 and inactive portion 252 are substantially aligned or coplanar (see FIG. 7).

Brake 242 may be actionable upon one or more wheels 210 when brake rod 246 is released or in a non-actuated position. Brake 242 may act upon wheels 210 in such a way that wheels 210 are prevented from turning, and thus, child transport apparatus 200 is prevented from moving or remains still. More specifically, when brake rod 246 is in an actuated state, brake 242 does not contact wheels 210 thereby allowing movement of child transport apparatus 200 by user. When brake rod 246 is in a non-actuated state, brake 242 contacts one or more wheels 210 thereby preventing movement of child transport apparatus 200. During use, a user may actuate brake rod 246 and hold handle 214 with his or her hands and push (or pull) child transport apparatus 200 to direct movement. The actuation of brake rod 246 by user causes the at least one brake 242 to lift off of wheels 210 to allow movement of child transport apparatus 200. When the user desires to stop movement of child transport apparatus 200, the user may release brake rod 246 thereby causing the at least one brake 242 to act upon or contact the at least one wheel 210 in order to prevent movement of child transport apparatus 200. As shown, brake 242 may be actionable upon two wheels 210 positioned on opposing sides of rear portion 208 of frame 202.

A brake line 248 may communicatively couple brake 242 and brake rod 246 such that when brake rod 246 is actuated by a user, brake 242 does not act upon wheels 210, and when brake rod 246 is not actuated by the user, brake 242 acts upon wheels 210. More specifically, when brake rod 246 is actuated by user, brake line 248 is pulled causing compression of spring 257 (FIG. 9) in such a way to lift brake 242 off of wheels 210 and allow movement. When brake rod 26 is not actuated by user, spring 257 force acts upon brake 248 which acts upon wheels 210 to prevent movement. Brake line 248 may run or extend along extension portion 212 of frame 202. Brake line 248 may include, for example, a flexible wire, stainless steel/steel cable. Brake line 248 may be similar to a bike cable in some embodiments. However, any other now known or later developed material may be used for brake line 248.

Figure 9:
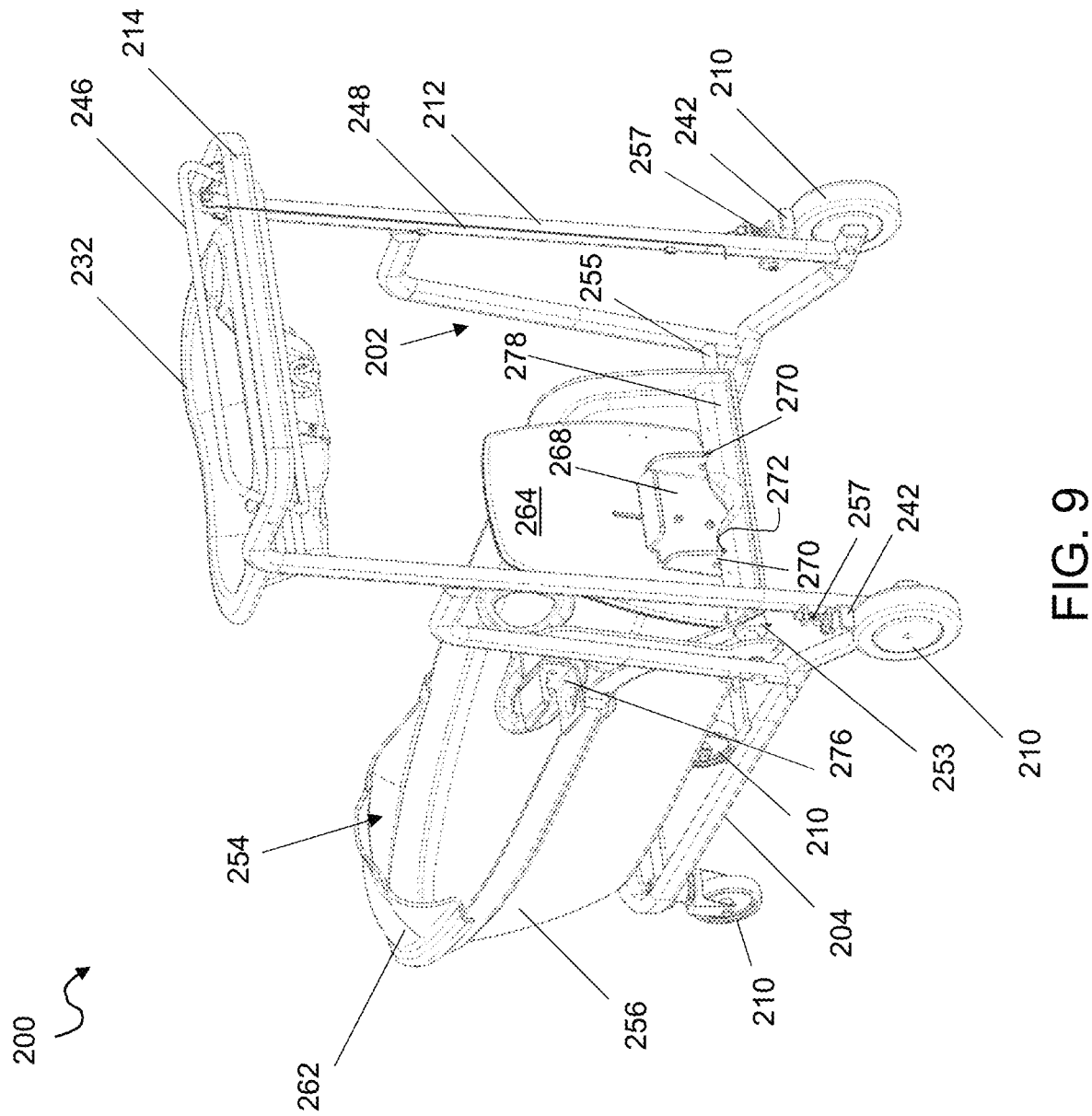
FIG. 9 shows a rear perspective view of the child transport apparatus according to an embodiment of the disclosure.

Child transport apparatus 200 may also include a carriage 254. Carriage 254 may be positioned over frame base 204 and may be pivotably attached to rear portion 208 of frame 202. For example, carriage 254 may be pivotably attached by brackets, bolts, and/or screws. In another example (as shown in FIG. 9), a bushing 253 may be disposed about or substantially surrounding a pivot point/rod/crossbar (hereinafter, crossbar 255) that may be disposed about a rear end 208 of frame 202, and carriage 254 may be directly attached to bushing via screws, adhesives, and/or bolts. In such an embodiment, bushing 253 may reduce friction between frame 202 and carriage 254 during pivoting of carriage. However, any other now known or later developed means or technique for pivotably attaching a carriage 254. As shown, carriage 254 may be substantially boat-shaped. However, carriage 254 may be any other shape without departing from aspects of the disclosure. For example, carriage 254 may be substantially shaped like a car, train, plane, rocket ship, princess carriage, etc. Carriage 254 may be of any color and include various designs or decals (not shown) to make child transport apparatus aesthetically pleasing to the patient and/or user. Carriage 254 may include a pair of opposing sidewalls 256. In some embodiments, a front end of each sidewall 256 may contact the front end of the opposing sidewall 256 at about front portion 206 of frame 202 such that sidewalls 256 taper at about front portion 206 of frame 202. However, in other embodiments a front wall (not shown) in may be disposed between and connect the front end of opposing sidewalls 256.

Figure 8:
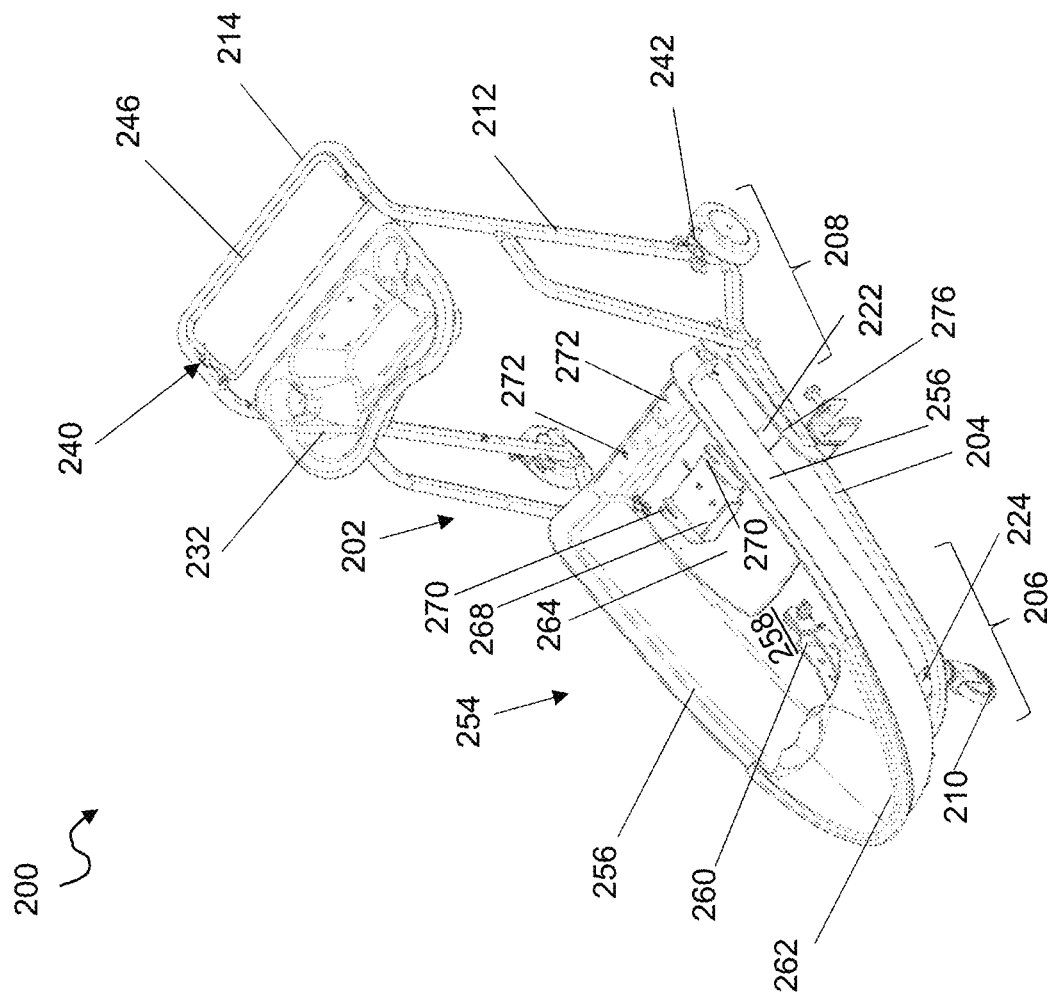
FIG. 8 shows a perspective view of a child transport apparatus according to an embodiment of the disclosure wherein the foldable backrest, the steering wheel accessory, and the accessory arm are in a folded down position.

Additionally, in some embodiments, a rear end of each sidewall 256 may be spaced apart relative to the opposing sidewall 256 at rear portion 208 of frame 202. Sidewalls 256 may have any desired height relative to a base 258 of carriage 254 to enable easy placement of patient into and out of carriage 254, while helping keep patient inside carriage 254 during transport. Carriage 254 including sidewalls 256 may be composed of at least one of: a metal, wood, plastic, or other material substantially rigid enough to transport a patient therein. In addition, a padding, foam, or fabric material may be provided within carriage 254 to provide comfort for the patient therein. Additionally, various accessories may be included within carriage 254 to enhance the experience of the user and/or patient during use. For example, carriage 254 may house an inactive or active steering wheel 260. That is, steering wheel 260 may or may not actually control steering of child transport apparatus 200. Steering wheel 260 may be pivotably attached to base 258 of carriage 254. For example, steering wheel 260 may be pivotably attached by brackets, bolts, adhesives, and/or screws. However, any other now known or later developed means or technique for pivotably attaching a steering wheel or accessory to base 258 of carriage 254. As shown in FIG. 8, steering wheel may pivot or fold in a forward down position when child transport apparatus 200 is not in use to aid in nesting or stacking of more than one child transport apparatus 200. In some embodiments, carriage 254 may include other accessories such as a canopy (not shown) overlying carriage 254.

In further embodiments, a partial cover 262 may be disposed over a front portion of carriage 254. Cover 262 may be of any shape, design, or color. For example, cover may be shaped to further enhance the shape of carriage 254. In one example, cover 262 may be shaped like a hood of a car where carriage 254 is substantially car-shaped. In another example, cover 262 may be shaped like a cover or deck found on bow of a canoe or boat where carriage 254 is substantially boat-shaped. Cover 262 may be attached to carriage 262, for example, by brackets, bolts, screws, welds, and/or adhesives. However, any other now known or later developed means or technique for attaching cover 262. In other embodiments, cover 262 may be integrally formed as part of carriage 254.

Further, child transport apparatus 200 may include a foldable backrest 264 as shown in FIGS. 5 and 8. Foldable backrest 264 may be pivotably attached to base 258 of carriage 254. For example, foldable backrest 264 may be pivotably attached by brackets, bolts, screws, or a hole or feature in the carriage. However, any other now known or later developed means or technique for pivotably attaching a backrest 264. Foldable backrest 264 may pivot at any angle to provide sufficient support for patient. In some embodiments, foldable backrest 264 may pivot such that the patient may lay substantially flat on their back. In some embodiments, foldable backrest 264 may pivot or fold in a forward down position when child transport apparatus 200 is not in use to aid in nesting or stacking of more than one child transport apparatus 200 as shown in FIG. 8. In some embodiments, foldable backrest 264 may be disposed within a track formed within base 258 of carriage 254 such that backrest 264 can not only pivot at various angles, but can slide back and forth within carriage 254 (for example, within a track disposed within base 258 of carriage 254) to aid in patient comfort.

Referring to FIGS. 8 and 9 together, an optional bracket 268 may be coupled, e.g., via bolts or screws, to a rear side of foldable backrest 264. Bracket 268 may include one or more projections 270 extending therefrom. Projections 270 may matingly engage with and/or be inserted within corresponding apertures 272 disposed within a portion of frame 202 and/or carriage 254. The projection 270 and aperture 272 configuration may assist in securing foldable backrest 264 in place when foldable backrest 264 is in the folded up or upright position as shown in FIGS. 5 and 9. In some embodiments, bracket 268 may be slidably coupled to foldable backrest 264 such that bracket 268 can slide up and down, for example, within a track within a rear surface of backrest 264, relative to carriage base 258 to assist in projections 270 matingly engaging and/or being inserted within apertures 272.

Still referring to FIGS. 5 and 8, child transport apparatus 200 may include one or more accessory arms 276 attached to frame 202. Accessory arm 276 can be pivotably attached to frame 202 via, e.g., a hinge or ball joint. Accessory arm 276 may be configured to support an accessory or medical equipment, e.g., an IV pole of an IV system (e.g. IV system 110 (FIG. 1) or a patient monitoring system or device. Accessory arm 276 may be moveable rotationally about its pivot point. Accessory arm 276 can aid in transporting the accessory with the patient alongside child transport apparatus 200. Accessory arm 276 can be moveable in such a way to enable transporting of the patient with the accessory or medical equipment while enabling navigation into tight places, e.g., through a doorway. Accessory arm 276 can pivot at various angles such that e.g., accessory arm 276 can pivot to a position that is substantially parallel with frame base 204 (FIGS. 5-8) or frame extension 212 (FIG. 9). A first end of accessory arm 276 can couple to frame 202 while a second end of accessory arm 276 can couple to the accessory. Accessory arm 270 may include, e.g., a latch, loop, rope, bracket, or adhesive connection for releasably coupling the accessory. It is to be understood that accessory arm 276 may be configured to support or attach to other types of accessories or medical equipment (e.g., an oxygen tank) needed to be transported with the patient. While only one accessory arm 276 is shown herein, it is to be understood that any number of accessory arms may be included without departing from aspects of the disclosure. That is, any number of accessory arms may be included in/on child transport apparatus 200 in order to couple more than one medical accessory to child transport apparatus 200 that may be transported with the patient.

Figure 10:
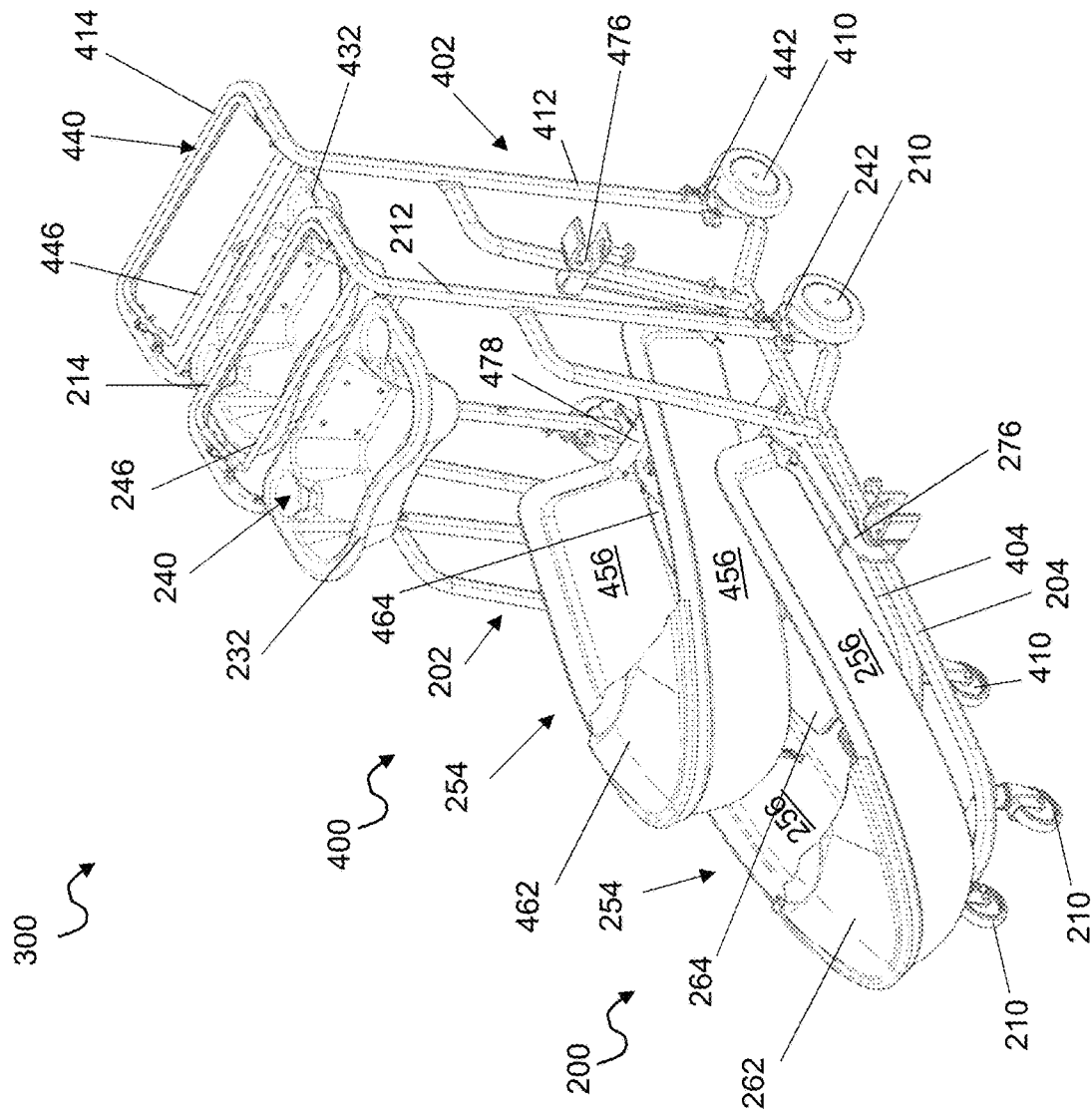
FIG. 10 shows a perspective view of an assembly of child transport apparatuses according to an embodiment of the disclosure.

FIG. 10 shows an assembly of child transport apparatuses 300 in a nested or stacked position. As shown, at least a first and second child transport apparatus may be included in assembly 300. However, it is to be understood that any number of child transport apparatuses can be nested or stacked together without departing from aspects of the disclosure. As shown, assembly 300 may include second child transport apparatus 400 together nested or stacked with first child transport apparatus 200. Like child transport apparatus 200, child transport apparatus 400 may include frame 402 having frame base 404, extension portion 412, handle 414, and crossbars (not individually labeled); wheels or casters 410; basket 432; braking mechanism 440 including at least one brake 442 (shown about rear wheels 410), at least one brake rod 446, and brake line (not individually labeled) coupling brake rod 446 and brake 442; carriage 454 including sidewalls 456 and carriage base (not individually labeled); steering wheel (not individually labeled); cover 462; foldable backrest 464 including bracket having projections for matingly engaging with apertures (not individually labeled); and accessory arm 476. Child transport apparatus 400 is substantially similar to child transport apparatus 200 and redundant explanation of the individual components thereof is excluded herein for brevity.

In the nested position, foldable backrest 264 of first child transport apparatus 200 may be positioned in a folded down position. Foldable backrest 464 of second child transport apparatus 400 may also be positioned in a folded down position. It may be desirable to position foldable backrest 464 in a folded down position to enable or prepare for nesting of a third child transport apparatus (not shown). However, where it is not desirable to nest another child transport apparatus with or in assembly 300, foldable backrest 464 may be positioned in a substantially upright or folded up position (e.g., similar to that of foldable backrest 264 shown in FIGS. 5 and 9) during nesting. Carriage 454 of second child transport apparatus 400 may be positioned at least partially within carriage 254 of first child transport apparatus 200 such that carriage 454 of second child transport apparatus 400 may be disposed at least partially over foldable backrest 264 of first child transport apparatus 200. Further, in the nested position, brake rod 248 of first child transport apparatus 200 may be actuated by a portion of second child transport apparatus 400 such that brake 242 is released from wheel 210. More specifically, inactive portion 252 of brake rod 248 may be actuated or forced upward by basket 432 of second child transport apparatus 400 as second child transport apparatus 400 is nested with first child transport apparatus 200 thereby positioning brake rod 248 in an actuated, non-braked position.

During nesting of child transport apparatuses 200, 400, second child transport apparatus 400 may be advanced distally toward and within a proximal end of first child transport apparatus 200. More specifically, a user may actuate brake rod 446 of second child transport apparatus 400 to allow movement of second child transport apparatus 400 toward and within the proximal end of the first child transport apparatus 200. Second child transport apparatus 400 may be advanced such that the front end of carriage 454 of second child transport apparatus 400 can be advanced through rear portion 208 of frame 202 in order to slide carriage 454 of second child transport apparatus 400 over foldable backrest 264 of first child transport apparatus 200 and into carriage 254 of first child transport apparatus 200. Carriage 454 of second child transport apparatus 400 may pivot slightly to accommodate the nesting. That is, during nesting, carriage 454 of second child transport apparatus 400 may pivot such that carriage 454 is lifted slightly off of frame base 404. As second child transport apparatus 400 is advanced toward and within a proximal end of first child transport apparatus 200, frame base 404 may advance beneath carriage 254 of child transport apparatus 200 within tapered frame base 202. Further, in some embodiments, an aperture or projection may be formed within an underside of each carriage 254, 454, and each carriage 254, 454 may further include a projection 280 (FIG. 9), 478 (FIG. 10) about the rear end of each carriage 254, 454.

Figure 11:
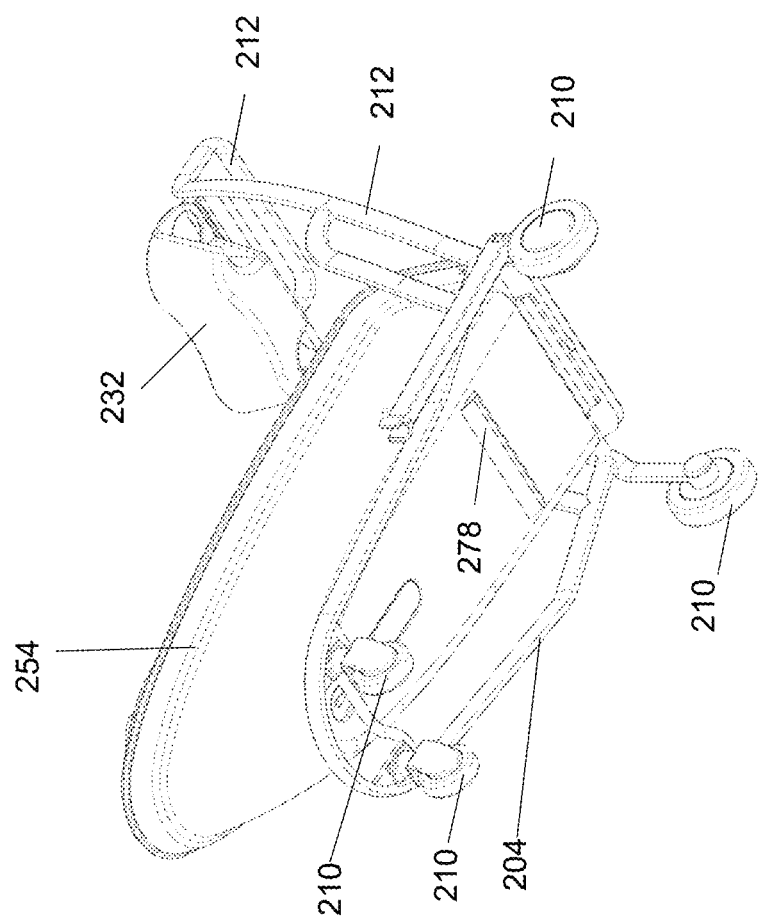
FIG. 11 show a perspective view of the underside a child transport apparatus according to an embodiment of the disclosure.

For example, FIG. 11 shows an underside of child transport apparatus 200 according to another embodiment. In this embodiment, each child transport apparatus 200, 40 may include a projection on an underside thereof. Referring to FIG. 11 specifically, child transport apparatus 200 may include a projection 278 extending from opposing sides of child transport apparatus 200 about an underside of carriage 254. The projections may assist in maintaining assembly of child transport apparatuses 300 in the nested position. More specifically, turning back to FIG. 10, the projection (not shown in FIG. 10) of second child transport apparatus 400 may matingly engage with projection 280 (FIG. 8) of first child transport apparatus 200 during nesting to help temporary/releaseably lock second child transport apparatus 400 in a nesting position with first child transport apparatus 200. The projections on the underside of each carriage may be sized and shaped to ensure mating engagement with projections on an upper rear end of the preceding child transport apparatuses that are desired to be nested.

Figure 4:
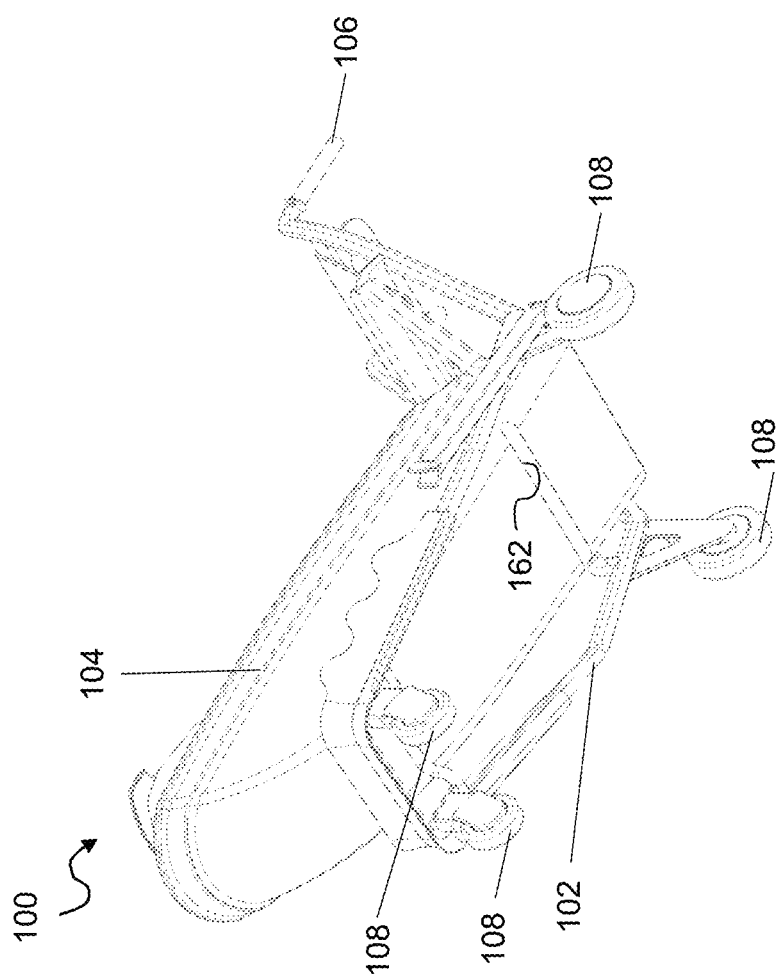
FIG. 4 show a perspective view of the underside a child transport apparatus according to an embodiment of the disclosure.

Further, as discussed relative to FIG. 4, in another embodiment, each child transport apparatus (e.g., child transport apparatus 100) may include an aperture (e.g., aperture 162) instead of a projection positioned on the underside of a carriage (e.g., projection 278 (FIG. 8)). Like projection 278, aperture 162 may extend from opposing sides of child transport apparatus 100 about an underside of carriage 104. The aperture of each carriage may assist in maintaining assembly of child transport apparatuses in the nested position. More specifically, the aperture on the underside of the carriage of a second child transport apparatus may matingly engage with projection on the upper rear end of a first child transport apparatus during nesting to help temporary/releaseably lock second child transport apparatus in a nesting position with first child transport apparatus 200. The apertures of each carriage may be sized and shaped to ensure mating engagement with projections of child transport apparatuses that are desired to be nested.

Further, during advancement of second child transport apparatus 200, a portion of frame 402 and/or container/basket 432 thereon may contact a portion of brake rod 246 (e.g., inactive portion 252) of first child transport apparatus 200 thereby causing brake rod 246 of first child transport apparatus 200 to actuate and brake 242 to lift off of wheels 210. As a result, user can now control movement of first child transport apparatus 200 together with movement of second child transport apparatus 400. That is, brake rod 446 of second child transport apparatus 400 can be used to control movement of first and second child transport apparatuses 200, 400 together. More specifically, the actuation or non-actuation of brake rod 446 of second child transport apparatus 400 also causes or prevents movement of first child transport apparatus 200 since brake rod 246 of first child transport apparatus 200 is in a non-actuated state.

While two child transport apparatuses are shown and discussed relative to assembly 300, it is to be understood that any number of child transport apparatuses can be nested without departing from aspects of the disclosure. It is to be further understood that it is the rearmost child transport apparatus in the assembly that may controlled and/or used by the user in order to move and/or control the assembly, and each child transport apparatus in the assembly may actuate the brake rod of the preceding child transport apparatus such that the brake rod of each child transport apparatus that precedes the rearmost child transport apparatus is in a non-braked, actuated state. This allows the user to easily transport the entire assembly without having to unbrake each child transport apparatus individually and to brake the entire assembly without having to brake each child transport apparatus individually.

When a child transport apparatus from assembly of child transport apparatuses 300 is needed, a user may grab the handle of the rearmost child transport apparatus together with the brake rod to release the brake off of the wheel and pull the rear most child transport apparatus until it is removed from the assembly. Upon separating the rearmost child transport apparatus from the assembly, the brake rod of the child transport apparatus that immediately preceded the rearmost child transport apparatus returns to its biased or resting position since it is no longer actuated by any portion of the rearmost child transport apparatus. At this time, this child transport apparatus becomes the new rearmost child transport apparatus that may be used to control movement of the entire assembly.

Figure 12:
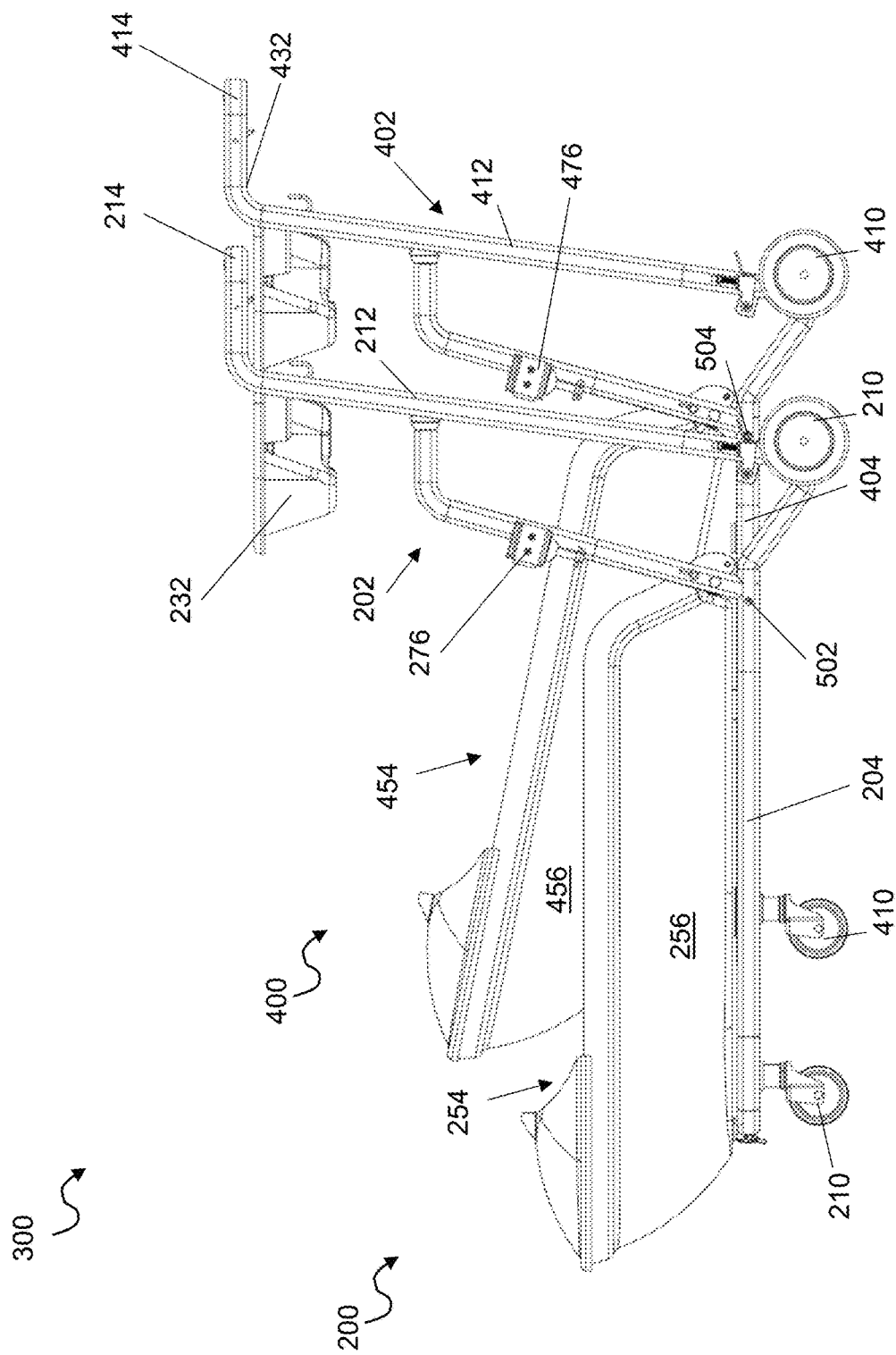
FIG. 12 shows a side view of an assembly of child transport apparatuses according to a embodiment of the disclosure.
Figure 13:
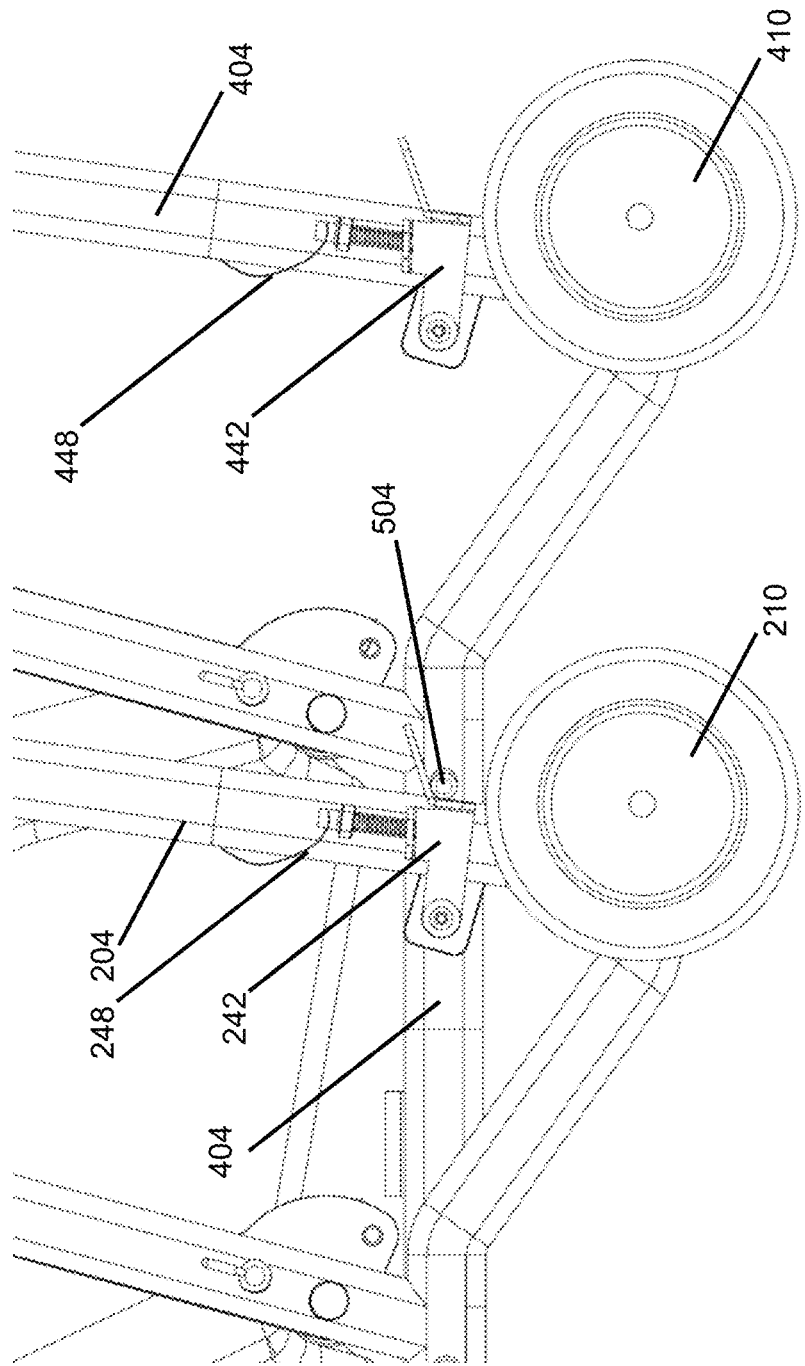
FIG. 13 shows an enlarged view of the pin of the second child transport apparatus of FIG. 12 interacting with the brake of the first child transport apparatus.

FIGS. 12-13 show another embodiment of the disclosure. In this embodiment, frames 202, 402 of child transport apparatuses 200, 400 may include one or more pins, rods, or projections (hereinafter "pins" 502, 504) extending from frames 202, 402. More specifically, pins 502, 504 may be positioned on opposing sides of frame base 204, 404 and extend in an outward direction from frame base 204, 404. That is, child transport apparatuses 200, 400 may include two pins, each on opposing sides of frame base 204, 404 and extending outwardly therefrom. Pin 502, 504 may be positioned such that during nesting of multiple child transport apparatuses 200, 400, pin 504 of second child transport apparatus 400 may interact with the brake 242 of first child transport apparatus 200 to release brake 242 of first child transport apparatus 200.

For example, FIGS. 12-13 shows first and second child transport apparatuses 200, 400 of FIG. 10 during nesting. However, as shown in FIGS. 12-13, each child transport apparatus 200, 400 includes a pair of opposing, outwardly extending pins 502, 504. As second child transport apparatus 400 is advanced toward and within proximal end of first child transport apparatus 200 during nesting, pin 504 of second child transport apparatus 400 contacts brake 242 resting on wheel 210 of first child transport apparatus 200. As the advancement of second child transport apparatus 400 continues, pin 504 interacts with brake 242 such that brake 242 is lifted off wheels 210. That is, instead of basket 432 or some other portion of frame 406 interacting with or activating brake rod 246, pin 504 interacts directly with brake 210. Like the embodiment of FIG. 10, a user can now move assembly 300 by activating brake rod 440 and causing brake 442 of second transport apparatus 400 to lift off of wheel 410 to allow movement of both first and second child transport apparatus together 200, 400.

While two child transport apparatuses are shown and discussed relative to assembly 300, it is to be understood that any number of child transport apparatuses can be nested without departing from aspects of the disclosure. It is to be further understood that it is the rearmost child transport apparatus in the assembly that may controlled and/or used by the user in order to move and/or control the entire assembly, and each child transport apparatus in the assembly may causing lifting of the brake of the preceding child transport apparatus such that the brake of each child transport apparatus that precedes the rearmost child transport apparatus is in a non-braked state. This allows the user to easily transport the entire assembly without having to unbrake each child transport apparatus individually and to brake the entire assembly without having to brake each child transport apparatus individually.

When a child transport apparatus from assembly of child transport apparatuses 300 is needed, a user may grab the handle of the rearmost child transport apparatus together with the brake rod to release the brake off of the wheel and pull the rear most child transport apparatus until it is removed from the assembly. Upon separating the rearmost child transport apparatus from the assembly, the brake rod of the child transport apparatus that immediately preceeded the rearmost child transport apparatus returns to its biased position since it is no longer actuated by any portion of the rearmost child transport apparatus. More specifically, the brake of the immediately preceding child transport apparatus may return to a braked position since the brake is not lifted off of the wheels by the pin of the rearmost child transport apparatus. At this time, this child transport apparatus becomes the new rearmost child transport apparatus that may be used to control movement of the entire assembly.

FIGS. 14-17 show a child transport apparatus 600 according to another embodiment of the disclosure. In this embodiment, child transport apparatus 600 includes a carriage 602 for carrying a child patient (not shown) therein. Carriage 602 may be composed of any rigid material capable of carrying a child patient therein. For example, carriage 602 may be composed of plastic. Carriage 602 may include a seat portion 608 capable of accommodating the patient therein. Seat portion 608 may be integrally formed as part of carriage 602. Further, a pivotable door 612 may be positioned within at least one sidewall of carriage 602 to allow the patient to easily get in and out of carriage 602. Door 612 may be composed of the same material as carriage 602 or of another rigid material known in the art. Pivotable door 612 may be pivotably attached to carriage 602, for example, via hinges, bolts, screws, or any other now known or later developed means for pivotably attaching door 612. Additionally, carriage 602 may include one or more cup holders (two shown) 614 formed within a rear end of carriage closest to the user.

Child transport apparatus 600 may also include a set of wheels. More specifically, child transport apparatus 600 may include a set of rear wheels 618 (two shown) and a set of front wheels 620 (two shown). However, any number of wheels may be included without departing from aspects of the disclosure. In some embodiments, an axel (not shown) may join wheels 618, 620 within a given set and be connected to an underside of carriage 602, e.g., via bolts, screws, brackets, etc. or other conventional means for attaching an axel to carriage 602. In other embodiments, wheels 618, 620 may include casters or swivel casters which may be connected to an underside of carriage 602. For example, where casters are used, wheels 618, 620 may be directly connected to an underside of carriage 602. Alternatively, where swivel casters are used, an opening (not shown) for each caster may be formed within underside of carriage 602 to accommodate a stem of each swivel caster. The stem and/or the opening may each be threaded to aid in connecting wheels 618, 620 to underside of carriage 602. In some embodiments, set of rear wheels 618 may include a pair of wheels and an axel, while set of front wheels 620 may include a pair of swivel casters, or vice versa.

Figure 14:
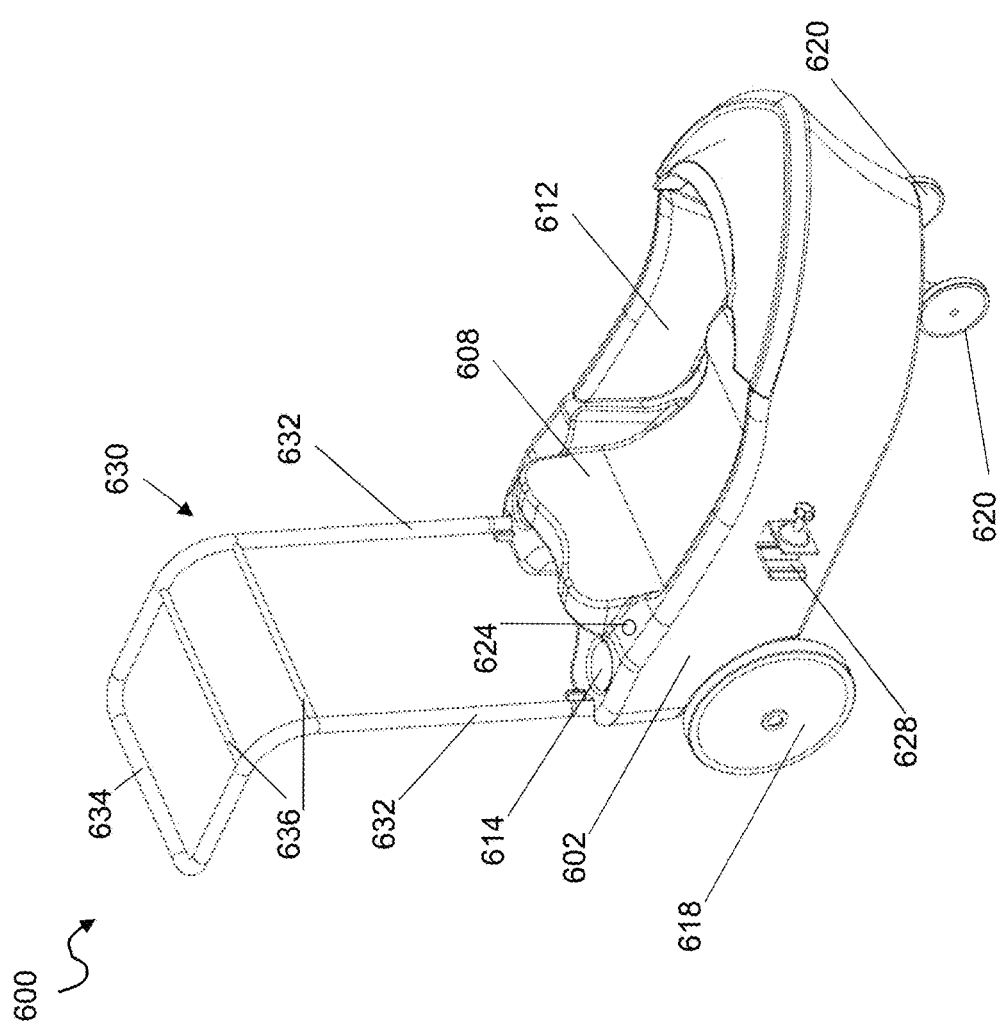
FIG. 14 shows a perspective view of a child transport apparatus according to an embodiment of the disclosure.

Carriage 602 may also include an opening 624 positioned within an upper surface about the perimeter of carriage 602. This opening 624 may be sized and shaped to secure an IV pole (not shown) therein. The IV pole may simply rest within this opening 624. However, in other embodiments, opening 624 and the IV pole may each be threaded such that IV pole may screw therein. In other embodiments, a clamp 628 may be disposed about an outer surface of carriage 602. More specifically, in some embodiments, clamp 628 may be disposed on an outer sidewall surface of carriage 602. Clamp 628 may be positioned on the outer surface of carriage 602 via, for example, adhesives, bolts, screws, or any other now known or later developed means for securing clamp 628 thereto. Clamp 628 may be sized and shaped to hold and secure the IV pole. Alternatively, clamp 628 may be adjustable, e.g., via a conventional screw mechanism, to tighten clamp 628 around the IV pole. While FIG. 14 shows clamp 628 and opening 624 used together, it is also to be understood that carriage 602 may only include one of clamp 628 or opening 624 for securing and transporting IV pole to child transport apparatus 600.

Child transport apparatus 600 may also include a handle mechanism 630. Handle mechanism 630 may be capable of folding. Handle mechanism 630 may include a pair of vertical extension portions 632 attached or connected to a rear surface of carriage 602. Vertical extension portions 632 may have a slight angle or bend to them as vertical extension portions 632 extend further away from carriage 602. Vertical extension portions 632 may extend beyond carriage 602 to any height and/or angle in order to provide a desired height of handle mechanism 630 relative to the user. Further, handle mechanism 630 may include a handle portion 634 connected to the pair of vertical extension portions 632. Handle portion 634 may extend horizontally between vertical extensions 632. Handle portion 634 may include a portion of handle mechanism 630 that the user may use or grab to assist user in moving, directing, and/or controlling child transport apparatus 600. Handle mechanism 630 may be composed of any rigid material, e.g., metal. Handle mechanism 630 may also include one or more crossbars for supporting handle mechanism 630.

Figure 15:
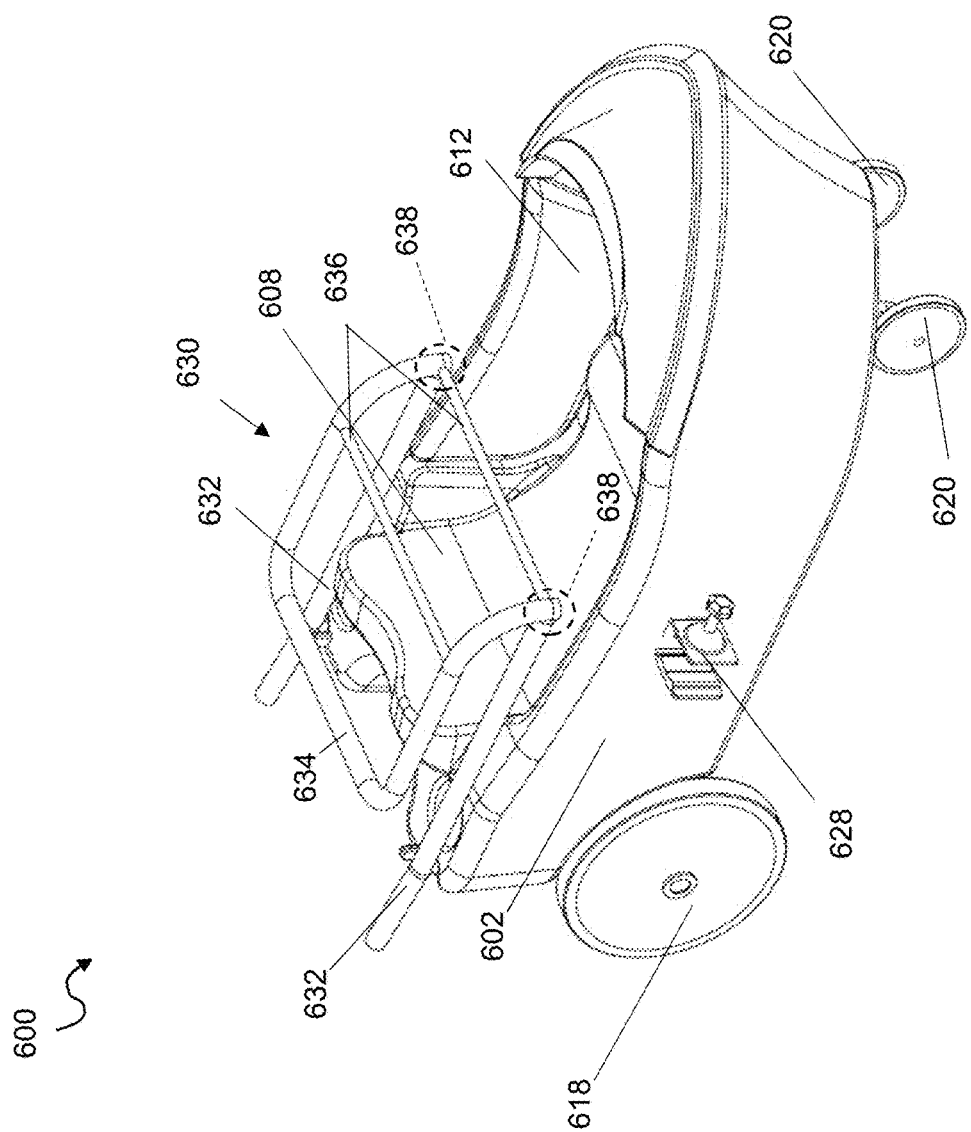
FIG. 15 shows a perspective view of the child transport apparatus of FIG. 14 when the handle mechanism is in a folded-down position.

The pair of vertical extension portions 632 may be pivotably attached to the rear surface of carriage 602. The pair of vertical extension portions 632 may be pivotably attached, e.g., via brackets, bolts, screws, etc. or any other now known or later developed means for pivotably attaching vertical extension portions 632. As shown in FIG. 15, the pair of vertical extension portions 632 may be pivotably attached such that handle mechanism 630 may pivot or fold over at least a portion of carriage 602 and/or seat portion 608 when a patient is not sitting therein. In addition, handle mechanism 630 may optionally include a pivot or fold point (designated by the portion within dotted lined circle) 638 about the length of each vertical extension 632. More specifically, this pivot or fold point 638 may include, e.g., a spring plunger, ball plunger, spring clip or bolt, to aid in pivoting or folding of vertical extensions 632. This optional pivot or fold point 638 may aid in reducing the overall height of child transport apparatus 600 prior to storage. As will be described herein, handle mechanism 630 may assist user in storing and supporting child transport apparatus 600 during storage.

Figure 16:
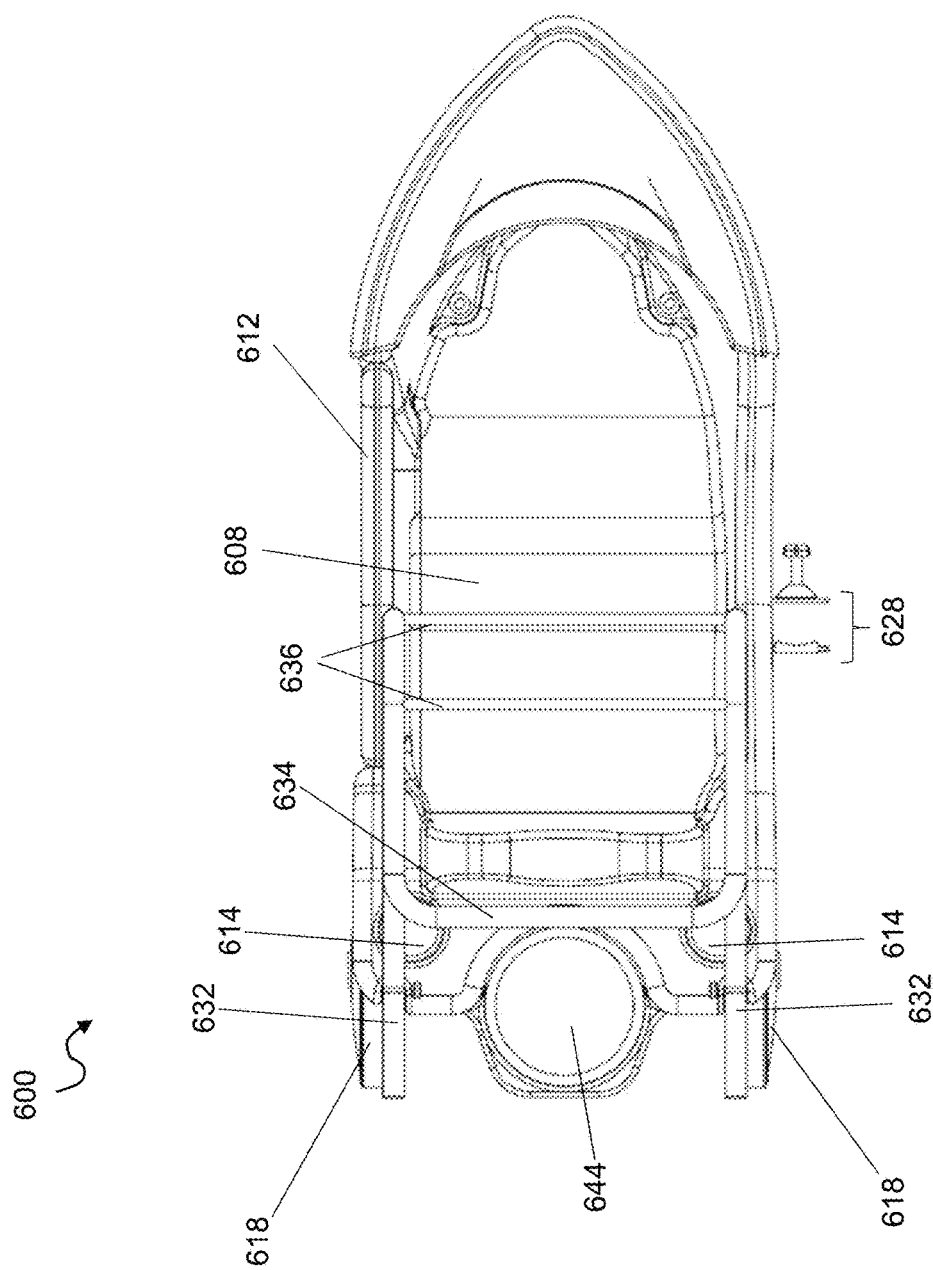
FIG. 16 shows a top-down view of the child transport apparatus of FIG. 15.

FIG. 16 shows a top-down view of child transport apparatus 600 according to FIG. 15. As shown, child transport apparatus 600 may also include a projection or platform 644 extending from a lower, rear surface of carriage 602. Platform 644 may provide a substantially planar surface for accommodating medical equipment (not shown), e.g., an oxygen tank, thereon. While platform 644 is shown and described as being located at about a lower, rear surface of carriage 602, it is to be understood that platform 644 may be located at any desirable position about carriage 602 for positioning the medical equipment thereon. Further, while only a single platform 644 is shown, any number of platforms may be included without departing from aspects of the disclosure. Platform 644 may be composed of the same material as carriage 602 of another rigid material known in the art. In some embodiments, platform 644 may be integrally formed as part of carriage 602. In other embodiments, platform 644 may be formed as a separate element and attached to carriage 602. To further ensure that the medical equipment remains disposed on platform 644 during transport of the child, straps (not shown) may be used. For example, straps may be attached to the rear surface of carriage 602 and may wrap around the medical equipment positioned on platform 644.

Like child transport apparatus 100, 200, 400 carriage 602 of child transport apparatus 600 according to this embodiment may also be of any color or include a design or decal to enhance the experience of the patient and/or user such that child transport apparatus 600 is aesthetically pleasing to patient and/or user. Further, accessories for enhancing user experience may be disposed within carriage 602, e.g., an active or inactive steering wheel (not shown in FIGS. 13-16, but similar to steering wheel 260 (FIG. 4)).

Figure 17:
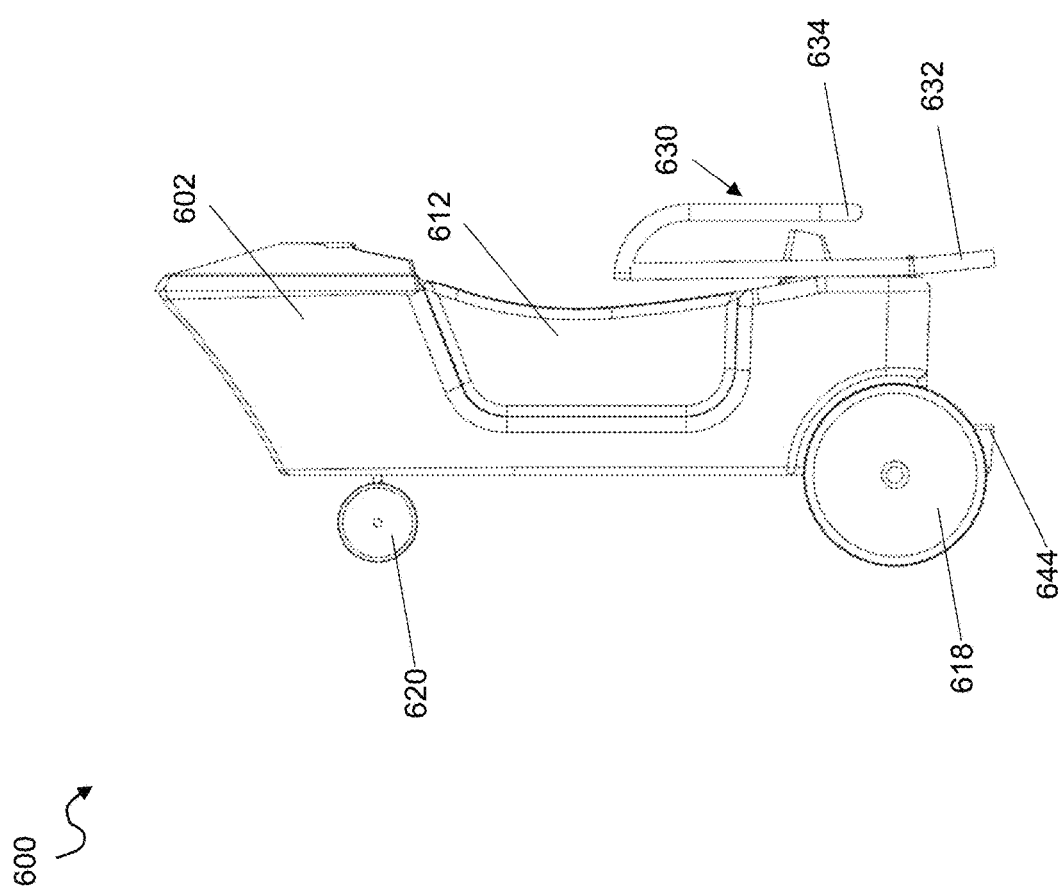
FIG. 17 shows a side view of the child transport apparatus of FIG. 15 when turned on its rear end.

In contrast to the previous embodiments discussed herein, child transport apparatus 600 according to this embodiment may be simply turned on one of its side or rear surfaces to reduce space for storage as shown in FIG. 17. That is, instead of nesting or stacking one or more child transport apparatuses 600 together, child transport apparatus 600 may simply turn and rest on one of its side or rear surfaces for storage adjacent to other child transport apparatuses. That is, when the child transport apparatus 600 is not in use (e.g., there is no patient sitting within child transport apparatus 600), and it is desirable to store child transport apparatus 600, the user may lift and turn (in some cases with the assistance of another) child transport apparatus 600 on its rear end. The storing of child transport apparatus 600 in this way results in the stored child transport apparatus 600 taking up less space than when it is left in its in use position.

During storage, child transport apparatus 600 may rest on its rear end and be supported on at least two of: the rear surface of carriage 602, a rear surface of platform 644, handle mechanism 630 when handle mechanism 630 is in a folded or retracted position, or the pair of rear wheels 618. As shown, for example, a portion of handle mechanism 630 may extend beyond the rear surface of carriage 602 to a degree or length that is substantially equal to a length that at least one of: platform 644 or set of rear wheels 618 extend beyond the rear surface of carriage 602 when handle mechanism 630 is in the folded position. As shown, the pair of vertical extensions 632 may assist in maintaining child transport apparatus 600 in its stored position. For example, referring to FIGS. 15-17, a portion of vertical extensions 632 may extend beyond a rear surface of carriage 602 when handle mechanism 630 is in the folded position. Vertical extensions 632 may extend beyond the rear surface of carriage 602 to a degree that is approximately equal to the length that platform 644 and/or set of rear wheels 618 extend beyond the rear surface of carriage 602. As a result, when child transport apparatus 600 is turned on its rear end for storage, child transport apparatus 600 rests on a combination of the portion of vertical extensions 632 that extend beyond the rear surface of carriage and at least one of set of rear wheels 618 or platform 644. When the user wishes to use child transport apparatus 600 to transport a child patient, the user may lift and turn (in some cases with the assistance of another) such that child transport apparatus 600 is that seat portion 608 is facing up and ready for a child patient to sit therein.

Figure 18:
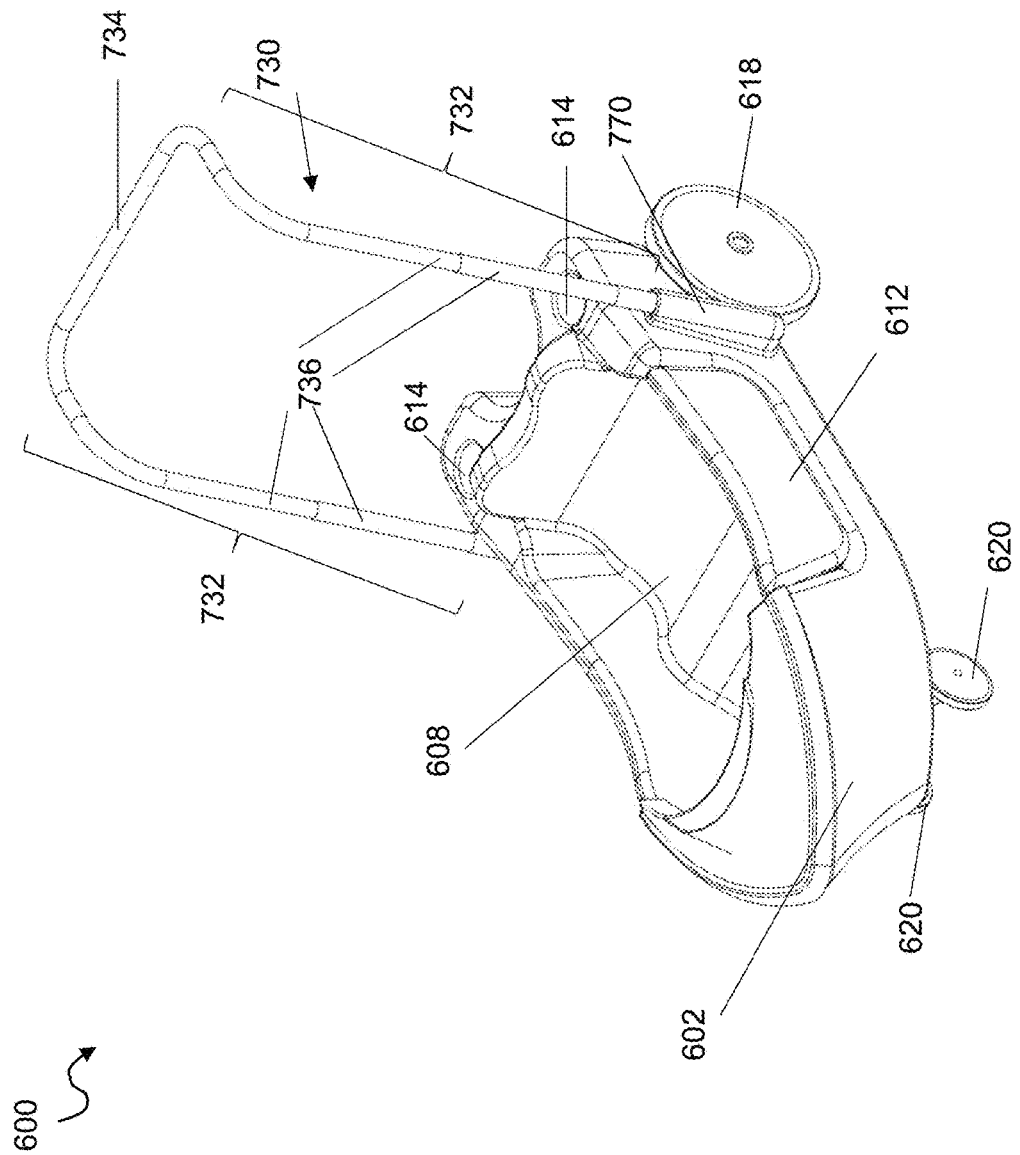
FIG. 18 a perspective view of a child transport apparatus according to an embodiment of the disclosure.
Figure 19:
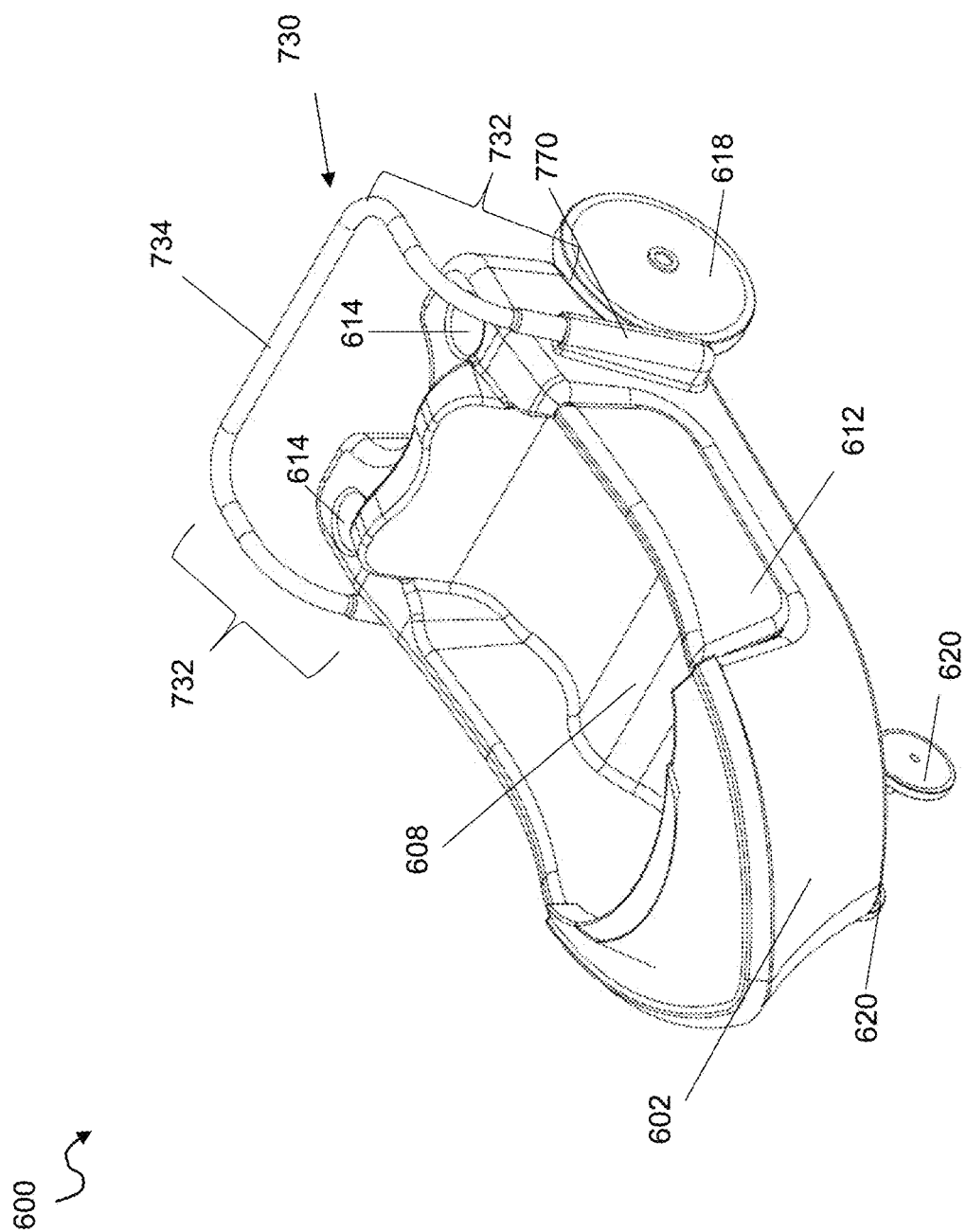
FIG. 19 shows a perspective view of the child transport apparatus of FIG. 18 when the handle mechanism is in a folded-down position.

FIGS. 18-20 show a child transport apparatus 600 according to another embodiment of the disclosure. In this embodiment, child transport apparatus 600 may include a retractable or telescoping handle mechanism 730 instead of foldable handle mechanism 630 (FIGS. 14-17). FIG. 18 shows handle mechanism 730 in a protracted state while FIG. 19 shows handle mechanism 730 in a retracted state. Referring to FIGS. 18-19 together, handle mechanism 730 may be substantially similar to a retractable luggage handle. That is, handle mechanism 730, or more specifically, vertical extensions 632, may retract within themselves and/or within chambers 740 formed on or within carriage 602 that are sized and shaped to accommodate the pair of vertical extensions 632. As shown, chambers 740 may be formed on opposing sides of carriage 602. However, chambers 740 may be positioned elsewhere, e.g., on a rear surface of carriage 602. In further embodiments, vertical extensions 632 may be retractable within an opening formed within an upper surface of carriage 602. As will be described herein, a portion of handle mechanism 730 may extend beyond the rear surface of carriage 602 to a degree or length that is substantially equal to a length that at least one of: platform 644 or set of rear wheels 618 extend beyond the rear surface of carriage 602 when handle mechanism 730 is in the retracted position.

Vertical extensions 632 may include one or more rods 736 which are capable of be depressed and elevated upon pushing or pulling by the user. Rods 736 may be of various diameters or widths in order to accommodate retracting. Rods 736 may include conventional locking mechanisms, e.g., a spring biased detent (not shown), in order to allow locking of handle mechanism 730 at various heights.

Child transport apparatus 600 according to this embodiment may still be simply turned on one of its side or rear surfaces to reduce space for storage as shown in FIG. 20. During storage, child transport apparatus 600 may rest on its rear end and be supported on at least two of: the rear surface of carriage 602, a rear surface of platform 644, handle mechanism 730 when handle mechanism 730 is in a folded or retracted position, or the pair of rear wheels 618. However, in this embodiment, handle mechanism 730 may be retracted and handle portion 734 may rest on the ground or surface that child transport apparatus 600 is disposed on during storage. Handle portion 734 may extend beyond the rear surface of carriage 602 to a degree that is approximately equal to the length that platform 644 and/or set of rear wheels 618 extend beyond the rear surface of carriage 602. As a result, when child transport apparatus 600 is turned on its rear end for storage, child transport apparatus 600 rests on a combination of handle portion 734 that extends beyond the rear surface of carriage and at least one of set of rear wheels 618 or platform 644. When the user wishes to use child transport apparatus 600 to transport a child patient, the user may lift and turn (in some cases with the assistance of another) such that child transport apparatus 600 is that seat portion 608 is facing up and ready for a child patient to sit therein.

This disclosure provides both functional value in at least the following: convenience in transporting patients by connecting IV poles to the transport; versatility of accommodating different size patients as well as patient positioning from sitting to laying down; pivoting of the IV Pole connection allows for transport to get through tighter pathways if needed; the ability to pivot and stack the carriage onto an adjacent transport frame; the frame and carriage combination can allow for the ability to custom design different carriage shapes that interact with the same frame design. This disclosure also provides an emotional value to the patient and parent by creating a positive experience while in use, which can reduce stress and improve recovery.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The particular embodiments disclosed above are illustrative only, as the disclosure may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the disclosure. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. An assembly of child transport apparatuses, the assembly comprising:

at least a first child transport apparatus and a second child transport apparatus, each child transport apparatus including:
- a frame having a frame base, at least one wheel attached to the frame base, and a handle, wherein the frame base includes a front portion that is tapered relative to a rear portion of the base, and wherein the handle is attached to the rear portion of the frame base;
- a carriage pivotably attached to the rear portion of the frame, the carriage including a pair of opposing sidewalls wherein the pair of opposing sidewalls taper towards each other at the front portion of the frame, and wherein a rear end of each sidewall is spaced apart relative to the opposing sidewall at the rear portion of the frame;
- a foldable backrest pivotably attached to a base of the carriage; and
- an accessory arm attached to the frame and configured to support an accessory, the accessory arm being moveable rotationally, wherein, in a nested position of the first and second child transport apparatuses, the foldable backrest of the first child transport apparatus is in a folded down position and the carriage of the second child transport apparatus is positioned at least partially within the carriage of the first child transport apparatus such that the carriage of the second child transport apparatus is disposed at least partially over the foldable backrest of the first child transport apparatus.

2. The assembly of child transport apparatuses of claim 1, wherein the accessory arm of each child transport apparatus is configured to attach to an IV pole during transport of a patient.

3. The assembly of child transport apparatuses of claim 1, wherein the foldable backrest of each child transport apparatus can pivot such that the foldable backrest may be positioned substantially flush with the base of the carriage.

4. The assembly of child transport apparatuses of claim 1, wherein each child transport apparatus further includes at least one of a cup holder or a container for holding patient belongings, a patient file, or a patient chart attached to the handle of each child transport apparatus.

5. The assembly of child transport apparatuses of claim 1, wherein the carriage of each child transport apparatus is composed of a plastic, and wherein the frame of each child transport apparatus is composed of a metal.

6. The assembly of child transport apparatuses of claim 1, wherein the carriage of each child transport apparatus is substantially boat shaped.

7. The assembly of child transport apparatus of claim 1, wherein an underside of the carriage of each child transport apparatus includes an aperture extending from opposing sides of the carriage, the aperture of the second child transport apparatus configured to matingly engage with a projection on a rear end of the carriage of the first child transport apparatus during nesting.

8. The assembly of child transport apparatus of claim 1, wherein an underside of the carriage of each child transport apparatus includes a first projection extending from opposing sides of the carriage, the first projection of the second child transport apparatus configured to matingly engage with a second projection on a rear end of the carriage of the first child transport apparatus during nesting.

* * * * *